(12) United States Patent
Nogita et al.

(10) Patent No.: US 11,980,974 B2
(45) Date of Patent: May 14, 2024

(54) SOLDER JOINT PART AND METHOD FOR MANUFACTURING THE SAME

(71) Applicants: NIHON SUPERIOR CO., LTD., Osaka (JP); The University of Queensland, Brisbane (AU)

(72) Inventors: Kazuhiro Nogita, Brisbane (AU); Stuart David Mcdonald, Brisbane (AU); Shiqian Liu, Brisbane (AU); Tetsuro Nishimura, Suita (JP); Takatoshi Nishimura, Tokyo (JP); Tetsuya Akaiwa, Osaka (JP)

(73) Assignees: Nihon Superior Co., Ltd., Osaka (JP); The University of Queensland, Brisbane (AU)

( * ) Notice: Subject to any disclaimer, the term of this patent is extended or adjusted under 35 U.S.C. 154(b) by 536 days.

(21) Appl. No.: 17/294,379

(22) PCT Filed: Oct. 31, 2019

(86) PCT No.: PCT/JP2019/042814
§ 371 (c)(1),
(2) Date: May 14, 2021

(87) PCT Pub. No.: WO2020/100614
PCT Pub. Date: May 22, 2020

(65) Prior Publication Data
US 2022/0009040 A1    Jan. 13, 2022

(30) Foreign Application Priority Data

Nov. 16, 2018 (JP) ................................. 2018-215247
Mar. 12, 2019 (JP) ................................. 2019-045284

(51) Int. Cl.
*B23K 35/26* (2006.01)
*B23K 1/19* (2006.01)
*C22C 28/00* (2006.01)

(52) U.S. Cl.
CPC ................ *B23K 35/26* (2013.01); *B23K 1/19* (2013.01); *C22C 28/00* (2013.01)

(58) Field of Classification Search
CPC ............ B23K 35/26; B23K 1/19; C22C 28/00
See application file for complete search history.

(56) References Cited

U.S. PATENT DOCUMENTS

| 9,704,964 B1 | 7/2017 | Ordonez et al. |
| 2010/0015004 A1 | 1/2010 | Ueshima |
| 2016/0366760 A1 | 12/2016 | Lee et al. |

FOREIGN PATENT DOCUMENTS

| JP | 2001-198692 A | 7/2001 | |
| JP | 2007-179922 A | 7/2007 | |
| JP | 2016-50324 A | 4/2016 | |
| WO | WO-0152323 A2 * | 7/2001 | ............. B23K 35/26 |
| WO | 2007/021006 A1 | 2/2007 | |

OTHER PUBLICATIONS

Liu et al., "Ga-Based Alloys in Microelectronic Interconnects: A Review," Materials, Aug. 8, 2018, pp. 1-20.

* cited by examiner

*Primary Examiner* — Jessee R Roe
(74) *Attorney, Agent, or Firm* — Fitch, Even, Tabin & Flannery LLP

(57) ABSTRACT

In a method for manufacturing a solder joint part, at least one of a first metal base material and a second metal base material is an alloy containing Ni in an amount of more than 0 wt % and less than 44 wt % and Cu in an amount of more than 56 wt %, and solder is a solder alloy containing Ga and inevitable impurities or a solder alloy containing Ga as a main component and having a melting point of 30° C. or lower. The method includes applying the solder to a surface of the first metal base material and placing the second metal base material on the applied solder, and heating the first and second metal base materials to a temperature of 90° C. or lower in a specified atmosphere or in a liquid to generate $CuGa_2$ or $(Cu, Ni)Ga_2$ between the first and second metal base materials, thereby joining the first and second metal material.

8 Claims, 22 Drawing Sheets

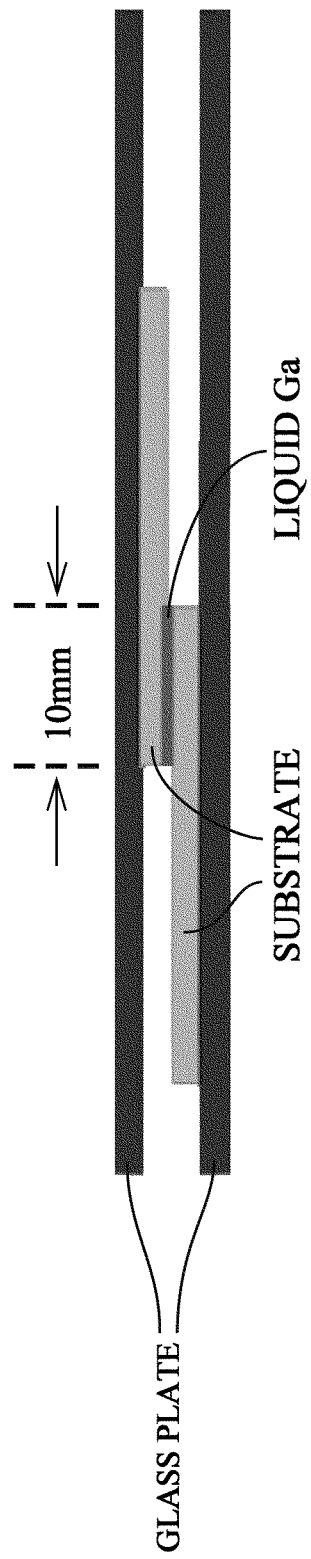

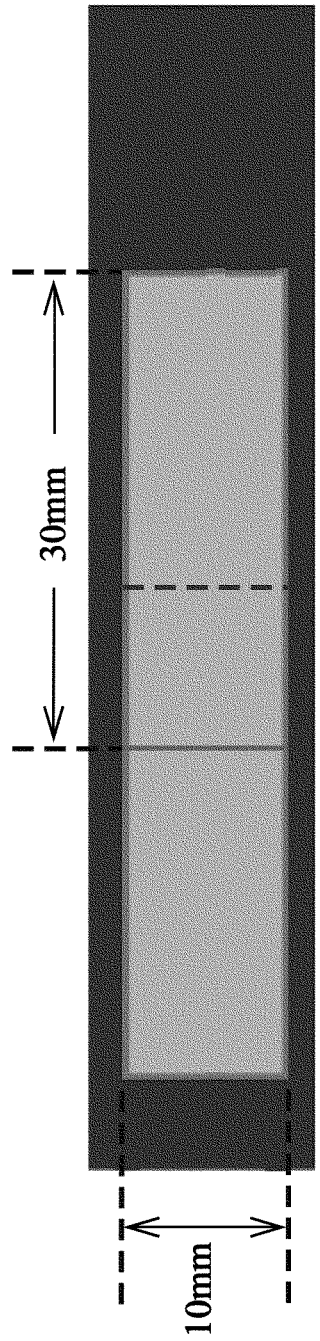

Point 1: Projection along [001]

Point 2: Projection along [100]

FIG. 19
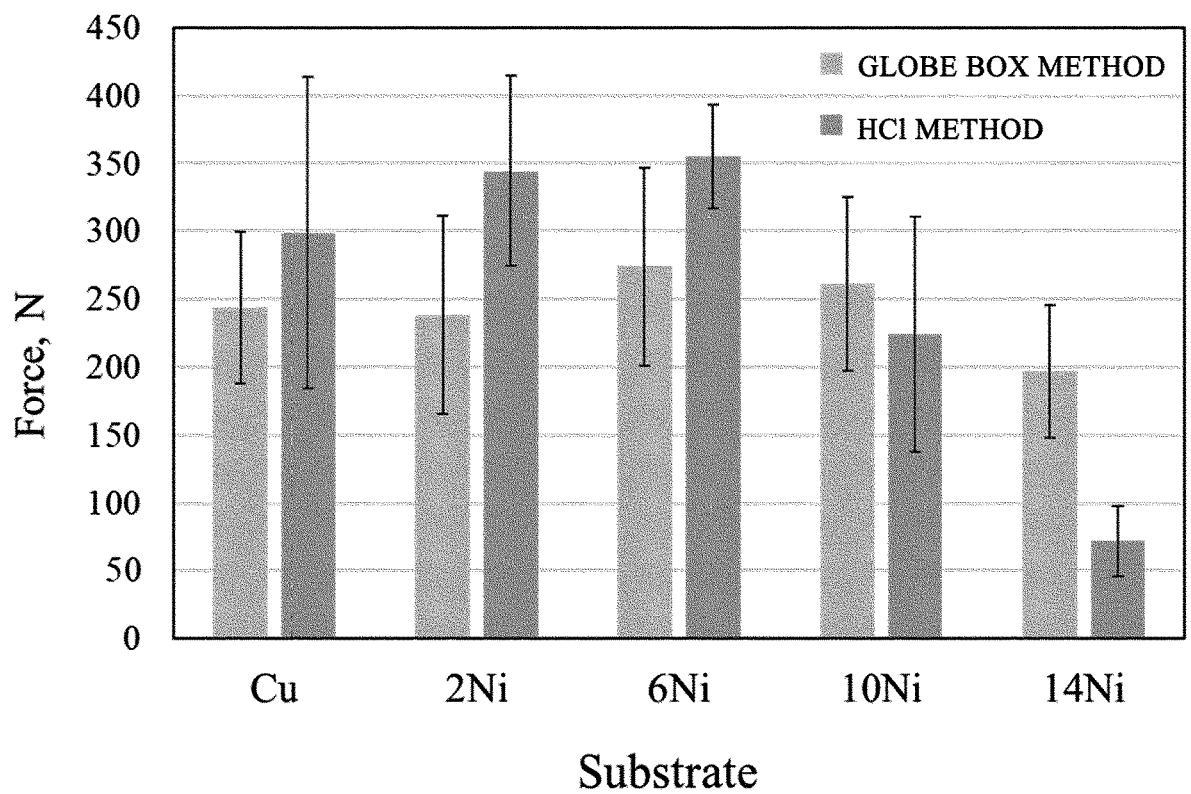
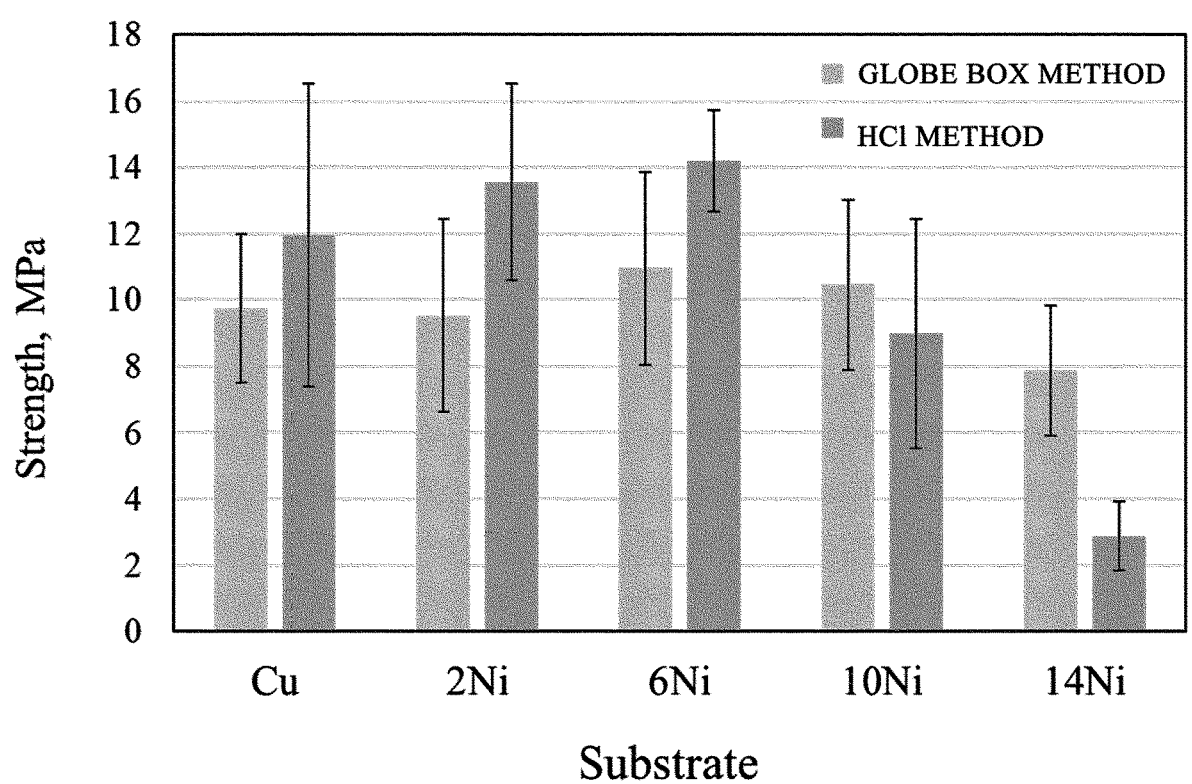

SOLDER JOINT PART AND METHOD FOR MANUFACTURING THE SAME

CROSS-REFERENCE TO RELATED APPLICATIONS

This application is a U.S. national phase application filed under 35 U.S.C. § 371 of International Application No. PCT/JP2019/042814, filed Oct. 31, 2019 which is based upon and claims the benefit of priority from the prior Japanese Application No. 2018-215247, filed Nov. 16, 2018 and prior Japanese Application No. 2019-045284, filed Mar. 12, 2019.

FIELD OF THE INVENTION

The present invention relates to a solder joint part and a method for manufacturing the solder joint part. More specifically, the present invention relates to a solder joint part enabling soldering at a low temperature and a method for manufacturing such a solder joint part.

BACKGROUND OF THE INVENTION

Low temperature solder has attracted a great deal of attention, because it enables process at low temperature and enables use of a substrate made of a material having low heat resistance.

Examples of the known low temperature solder include: low temperature solder (Patent Literature 1) having the composition in which In is contained in the range of 50 to 83 at % (35.4 to 72.8 mass %) with Bi as the balance; and lead-free low temperature solder for electronic component joint (Patent Literature 2) having the composition in which In is contained in the range of 48 to 52.5 mass % with Bi as the balance. The latter lead-free low temperature solder has the solidus temperature of 85° C. or higher and the liquidus temperature of 110° C. or lower, and a $BiIn_2$ intermetallic compound exists in the structure of the lead-free low temperature solder.

Although the liquidus temperature of the low temperature solder described above is around 100° C., that is, 90 to 110° C., further development in technique is required for the low temperature solder to be used in a flexible substrate that has rapidly attracted much attention in recent years. Specifically, it is necessary for the low temperature solder to have flexibility for preventing break of a joint part even when the substrate is deformed, in addition to the reduction in its temperature required for joint.

CITATION LIST

Patent Literature

Patent Literature 1: Japanese Patent Application Laid-open No. 2001-198692
Patent Literature 2: International Application Publication No. 2007/021006

SUMMARY OF INVENTION

An object of the present invention is to provide: a method for manufacturing a solder joint part enabling joint of metal members in a substrate even at 90° C. or lower and having flexibility with which the solder joint part is hard to break even on a deformable substrate, such as a flexible substrate; and a solder joint part obtained by the method.

To solve the problem described above, the inventors of the present invention have investigated techniques enabling joint of electronic circuits on a flexible substrate, and found that: the joint is enabled at a low temperature of 90° C. or lower by adopting copper or a copper-nickel alloy as a metal base material to be provided on the substrate and adopting a gallium alloy as a joint material; and the intermetallic compound generated between the metal members has flexibility. As a result, the inventors have completed the present invention.

Specifically, the gist of the present invention is as follows:
(1) a method for manufacturing a solder joint part joining a first metal base material and a second metal base material with solder,
at least one metal base material of the first metal base material and the second metal base material being an alloy including Ni in an amount of more than 0 wt % and less than 44 wt % and Cu in an amount of more than 56 wt %,
the solder being a solder alloy containing Ga and inevitable impurities or a solder alloy containing Ga as a main component and having a melting point of 30° C. or lower,
the method comprising:
applying the solder to a surface of the first metal base material and placing the second metal base material on the applied solder; and
heating the first metal base material and the second metal base material to a temperature of 90° C. or lower in one of a noble gas atmosphere, an atmospheric air, and a liquid, to generate $CuGa_2$ or $(Cu, Ni)Ga_2$ between the first metal base material and the second metal base material, thereby joining the first metal material and the second metal material,
(2) the method according to (1) described above, further including
applying the solder also to a surface of the second metal base material, allowing the solder applied surface of the first metal base material and the solder applied surface of the second metal base material to face each other, and bringing the surfaces into contact with each other,
(3) the method according to (1) or (2) described above, in which the solder is directly placed on the surface of the first or the second metal base material,
(4) the method according to any one of (1) to (3) described above, in which each of the first and the second metal base materials is a Cu—Ni alloy containing Ni in an amount of more than 0 wt % and less than 44 wt % and Cu in an amount of more than 56 wt %,
(5) the method according to any one of (1) to (4) described above, in which the noble gas is argon gas or nitrogen gas,
(6) the method according to any one of (1) to (4) described above, in which the liquid is hot water or an aqueous solution of inorganic acid,
(7) the method according to any one of (1) to (6) described above, in which one of the first and the second metal base materials is a wire formed on an electronic circuit board, and the other is a terminal of an electronic component, and
(8) a solder joint part including a first metal base material and a second metal base material joined to each other via a solder layer, in which
at least one metal base material of the first metal base material and the second metal base material is an alloy containing Ni in an amount of more than 0 wt % and less than 44 wt % and Cu in an amount of more than 56 wt %, and the solder layer includes a continuous phase of intermetallic compounds of Cu, Ni, and Ga, and contains $CuGa_2$ or $(Cu, Ni)Ga_2$.

The solder joint method according to the present invention enables joint even at heating temperature of 90° C. or lower. This structure enables reduction in load on the base material due to the temperature during joint, and enables manufacturing of electronic circuits using a substrate formed of a resin, the manufacturing of such electronic circuits having been difficult in conventional art. In addition, the present invention is applicable to electronic components having low heat resistance, such as LEDs and pressure sensors. Furthermore, the present invention is applicable to minute parts and 3D applications with a dispenser, a jet printer, and the like because solder in a liquid state is used.

In addition, because the solder joint part according to the present invention has flexibility with which the solder joint part is hard to break even when it is deformed, the solder joint part can be suitably used for the field of microelectronics, such as electronic circuits in a flexible substrate.

BRIEF DESCRIPTION OF DRAWINGS

FIG. 1 is a schematic diagram of a solder joint part manufactured in Example 1. FIG. 1A is a sectional view as viewed from side, and FIG. 1B is a schematic diagram as viewed from above.

FIG. 11A illustrates a result in a Cu substrate, and FIG. 11B illustrates a result in a Cu-10Ni substrate.

FIG. 12A illustrates the IMC on the CU substrate after contact with Ga for 5 to 40 hours at 30° C., and FIG. 12B illustrates the IMC on the Cu-10Ni substrate.

FIG. 18A illustrates an a axis, FIG. 18B illustrates a c axis, and FIG. 18C illustrates a unit cell volume.

FIG. 19 includes graphs illustrating results of shear strength of samples of solder joint parts obtained in Examples 2 and 3 in Test Example 7.

DESCRIPTION OF EMBODIMENTS

Figure 2A:
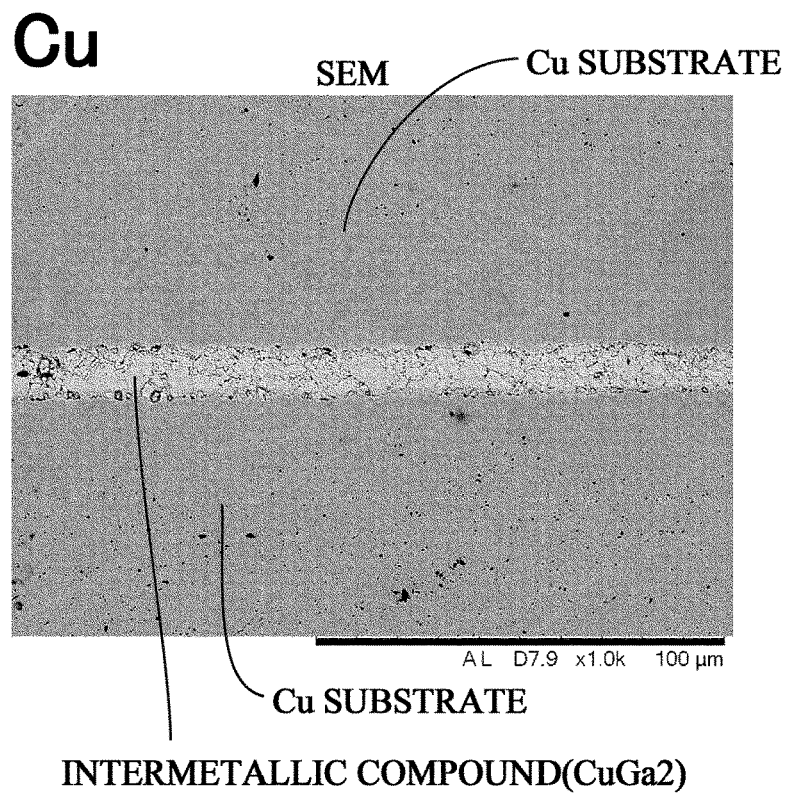
FIGS. 2A and 2B are sectional views of a solder joint part on a Cu substrate respectively with a scanning electron microscope (SEM) (FIG. 2A) and with an optical microscope (FIG. 2B).

A method for manufacturing a solder joint unit according to the present invention (hereinafter also referred to as "method of the present invention") is a method for manufacturing a solder joint part joining a first metal base material and a second metal base material with solder, at least one metal base material of the first metal base material and the second metal base material being an alloy including Ni in an amount of more than 0 wt % and less than 44 wt % and Cu in an amount of more than 56 wt %, the solder being a solder alloy containing Ga and inevitable impurities or a solder alloy containing Ga as a main component and having a melting point of 30° C. or lower, the method comprising:

applying the solder to a surface of the first metal base material and placing the second metal base material on the applied solder; and heating the first metal base material and the second metal base material to a temperature of 90° C. or lower in one of a noble gas atmosphere, an atmospheric air, and a liquid, to generate $CuGa_2$ or $(Cu, Ni)Ga_2$ between the first metal base material and the second metal base material, thereby joining the first metal material and the second metal material.

Each of the first metal base material and the second metal base material is a base material forming an electronic circuit, and the base materials are joined with solder so as to be electrically connected. Specifically, it suffices that one of the first and the second metal base materials is a wire formed in an electronic circuit board, and the other is a terminal of the electronic component.

The present invention is characterized in that at least one metal base material of the first metal base material and the second metal base material is an alloy in which a Ni content is more than 0 wt % and less than 44 wt % and a Cu content is more than 56 wt %.

At least one of the first metal base material and the second metal base material is formed of an alloy having a specific Ni content and a specific Cu content adjusted as described above. With this structure, when the first and second metal base materials are joined using, as solder, a solder alloy formed of Ga and inevitable impurities or a solder alloy including Ga as a main component and having a melting point of 30° C. or lower, an intermetallic compound is generated from Cu and Ga, or Cu, Ni, and Ga derived from the first metal base material and/or the second metal base material, and thus the first metal base material and the second metal base material can be electrically joined (soldered).

It is preferable that each of the first metal base material and the second metal base material is formed of the alloy having the specific Ni content and the specific Cu content adjusted as described above, because an intermetallic compound is generated more easily with Cu, Ni, and Ga derived from the first metal base material and the second metal base material.

When both of the first metal base material and the second metal base material have a Ni content equal to or higher than 44 wt %, a void running across the solder layer is easily generated, or needle-like $CuGa_2$ or $(Cu, Ni)Ga_2$ is generated. This structure causes lack in joint strength, and prevents exhibition of flexibility.

When each of the first metal base material and the second metal base material is a Cu—Ni alloy having a Ni content of more than 0 wt % and less than 44 wt % and a Cu content of more than 56 wt %, voids are reduced in the solder layer as described in Examples described later, and a solder joint part with a more excellent mechanical property and electrical conductivity can be formed. The lower limit of the Ni content is preferably 0.1 wt % or more, and the upper limit thereof is preferably 20 wt % or less.

The present invention is also characterized in that the solder is a solder alloy formed of Ga and inevitable impurities or a solder alloy including Ga as a main component and having a melting point of 30° C. or lower.

As the "solder", an alloy including lead and tin as main components has been widely used in conventional art. In the present invention, an alloy including Ga as the main component is used. In addition, in the present invention, an alloy prepared to contain the specific amount of Ni and the specific amount of Cu as described above is used for the first metal base material and/or the second metal base material, so that an unprecedented intermetallic compound including Cu, Ni, and Ga is generated in the joint part. Accordingly, the first metal base material and the second metal base material can be electrically joined (soldered).

The term "melting point" of the solder alloy means a solidus temperature.

Examples of the solder alloy formed of Ga and inevitable impurities include an alloy substantially formed of Ga.

Ga (gallium) is metal having a melting point of 29.8° C. The solder alloy used in the present invention includes Ga as the main component, and thus enables joint at low temperature of 90° C. or lower, preferably 50° C. or lower, and more preferably 30 to −19° C.

It suffices that the content of the inevitable impurities is 0.1 wt % or less.

The solder alloy including Ga as the main component and having a melting point of 30° C. or lower is an alloy obtained by adding In or Sn to Ga. Examples of the alloy include: an alloy having a Ga content of 78.6 wt %, an In content of 21.4 wt %, and a melting point of 15.3° C.; an alloy having a Ga content of 75.5 wt %, an In content of 24.5 wt %, and a melting point of 15.5 to 30° C.; and a Galinstan alloy having a three-component composition of Ga, In, and Sn (Ga content of 68.5 wt %, In content of 21.5 wt %, Sn content of 10 wt %, and melting point of −19° C.).

In the method of the present invention, the solder is applied to the surface of the first metal base material, and thereafter the second metal base material is placed on the applied solder.

The method for applying the solder to the surface of the first metal base material may be any publicly known method, and is not specifically limited. For example, it suffices that the solder is attached to a soldering nozzle, the heating temperature of the soldering nozzle is set low, and the molten solder is dropped on and applied to the surface of the first metal base material.

The second metal base material is placed on the solder that has been applied as described above. It suffices that the solder is in a molten state and the second metal base material is placed on the solder under an atmospheric air at, for example, 30° C. or higher.

In addition, in the method according to the present invention, the solder may also be applied to the surface of the second metal base material in the same manner as the first metal base material. Then, the solder applied surface of the first metal base material and the solder applied surface of the second metal base material may face each other, to allow the surfaces to be into contact with each other. In this case, the solder can be applied to a desired surface of the second metal base material, thereby enabling a more minute and secure solder joint part to be formed.

Ga included in the solder facilitates generation of the intermetallic compound with Cu and Ni derived from the first and/or the second metal base material(s). In view of this fact, the solder may be directly placed on the surface of the first and/or the second metal base material(s) without applying a flux.

Subsequently, in the method of the present invention, the first metal base material and the second metal base material are heated to a temperature of 90° C. or lower under a noble gas atmosphere or an atmospheric air or in a liquid to allow $CuGa_2$ or $(Cu, Ni)Ga_2$ to be generated as the intermetallic compound between the first metal base material and the second metal base material, and thereby the first and the second metal base materials are joined.

Examples of the noble gas include argon gas and nitrogen gas. In the noble gas atmosphere, the oxygen concentration is preferably adjusted to a state less than 0.1 ppm.

Examples of the liquid include hot water and an aqueous solution of inorganic acid.

In the present invention, the process may be performed in the liquid described above. In the liquid, the temperature is low, and temperature control can be easily performed. In addition, atmosphere control (in particular, control of the oxygen concentration) is not difficult unlike the case where process is performed in noble gas.

The term "hot water" means water heated to a room temperature or higher and lower than 100° C.

Examples of the inorganic acid include hydrochloric acid, acetic acid, and formic acid.

The concentration of the inorganic acid in the aqueous solution of inorganic acid is not specifically limited unless the solder joint part is not excessively oxidized. For example, the concentration of the inorganic acid is preferably 10 wt % or less.

In addition, the expression "in the liquid" may mean any state as long as the surface of the first metal base material or the second metal base material, to which the solder is to be applied, is wet with liquid. For example, the expression "in the liquid" includes the state in which liquid adheres to the surface of the first metal base material or that of the second metal base material, to which the solder is to be applied, by dropping, spraying, or applying the liquid so as to cause the surface to be wet, as well as the first and the second metal base material are immersed in the liquid.

In addition, in the case of using inorganic acid, the whole first metal base material and the second metal base material and the solder may be immersed in water to locally introduce inorganic acid by locally distributing/injecting the organic acid into the region to be joined.

Although it cannot be said sweepingly because of the composition of the metal base material or the like, the solder joint part joined in the liquid as described above tends to have larger joint strength than that of a solder joint part joined under a noble gas atmosphere or an atmospheric air.

After the solder joint part joined in the liquid described above is taken out of the liquid, the liquid can be removed by cleaning the solder joint part with ethanol, hot water, and the like.

It suffices that the heating temperature is any temperature of 90° C. or lower. Here, for the solder in the method of the present invention, an alloy using Ga and having a low melting point is used. Accordingly, the heating temperature may be a low temperature of 50° C. or lower, or 30° C. to −19° C.

In the case of performing heating in the liquid, the heating temperature is preferably 30 to 40° C. With such a heating temperature, good handling and manufacturing with efficiency can be achieved.

The heating method may be any method through which the solder between the first metal base material and the second metal base material can be heated. Examples of the heating method include methods using a reflow furnace and a hot plate, but the method is not specifically limited.

When the heating is performed, pressure may be applied to the first metal base material and the second metal base material, from the outside thereof. In such pressurization, proper pressure may be applied according to the first/second metal base material(s) and the material of the substrate.

The time for which the heating is performed may be properly adjusted according to the area to be joined and/or the Ni concentration of the Cu—Ni metal, and is not specifically limited.

After the heating, the structure is cooled to a normal temperature. The cooling method may be any publicly known method in soldering, and is not specifically limited.

The heating induces reaction of Cu and Ni derived from the first metal base material and the second metal base material with Ga included in the solder, to allow an intermetallic compound $CuGa_2$ of Cu and Ga or an intermetallic compound $(Cu, Ni)Ga_2$ of Cu, Ni, and Ga to be generated. This structure forms a solder joint part in which the first metal base material and the second metal base material are joined with a solder layer including the intermetallic compound.

The solder layer is formed of a continuous phase of the intermetallic compound, such as $CuGa_2$ or $(Cu, Ni)Ga_2$. This state can be confirmed by observing the structure with a SEM or an optical microscope.

The state of the continuous phase includes a state in which the layer is densely filled with the intermetallic compound, and a state in which a void exists in the intermetallic compound.

The compound $CuGa_2$ and $(Cu, Ni)Ga_2$ described above are types of the intermetallic compound. The solder joint part according to the present invention has not only joint strength but also flexibility, because the solder layer includes $CuGa_2$ and $(Cu, Ni)Ga_2$. With this structure, for example, even when the solder joint part is formed on a flexible substrate, the solder joint part is not broken due to deformation of the substrate, and the electrical connection state can be retained.

Whether the intermetallic compound is included in the solder layer can be confirmed using a SEM, an EDS, and the like.

The compound $(Cu, Ni)Ga_2$ also includes Ga—Ni—Cu, $Ga_4(Ni, Cu)$, $\gamma_3$-$Cu_9Ga_4$ ($Cu_{7.15}Ga_{5.85}$).

The solder joint part according to the present invention has the feature as described above. Accordingly, such a solder joint part can be suitably used upon manufacturing of a flexible substrate, as well as manufacturing of an ordinary electronic circuit board.

In addition, in the case of using a solder alloy including Ga having a melting point lower than a room temperature as the main component, the present invention also enables execution of solder repairing and rework in an environment in which soldering has to be performed at a low temperature equal to or lower than the room temperature, such as in a subfreezing environment in which no heat source can be obtained (such as an outdoor field in winter, and space).

EXAMPLE

Example 1

As substrates (thickness of 0.03 mm) including Cu, three types of substrates were prepared. The respective Ni contents of the three types of substrates were 0 wt % (Cu substrate), 1 wt % (Cu-1% Ni substrate), and 10 wt % (Cu-10% Ni substrate).

The substrates were cut into the size having a width of 10 mm and a length of 30 mm, and the Cu substrates, the Cu-1% Ni substrates, and the Cu-10% Ni substrates were grouped into respective sets.

Liquid Ga (Ga content: 100 wt %) heated to 30° C. was applied to one substrate over a length of 10 mm on one end side.

Thereafter, a 10 mm portion on one end side of the other substrate is placed on the liquid Ga alloy, and the outer sides of the two substrates were held with two glass plates and pressurized, as illustrated in FIGS. 1A and 1B (the pressure was obtained by holding two portions on both ends with clips).

Thereafter, the member held between two Cu—Ni substrates was left for 7 days at 30° C. under an argon gas atmosphere (oxygen concentration of less than 0.1 ppm and moisture value of less than 1.0 ppm), and then a solder joint part was obtained.

It was verified using a SEM and an EDS that the solder layer of the obtained Cu-1% Ni substrate included (Cu, Ni)Ga$_2$ of 0.03 wt %, and the solder layer of the Cu-10% Ni substrate included (Cu, Ni)Ga$_2$ of 0.3 wt %.

The obtained three types of solder joint parts were observed with the SEM and an optical microscope.

Figure 2B:
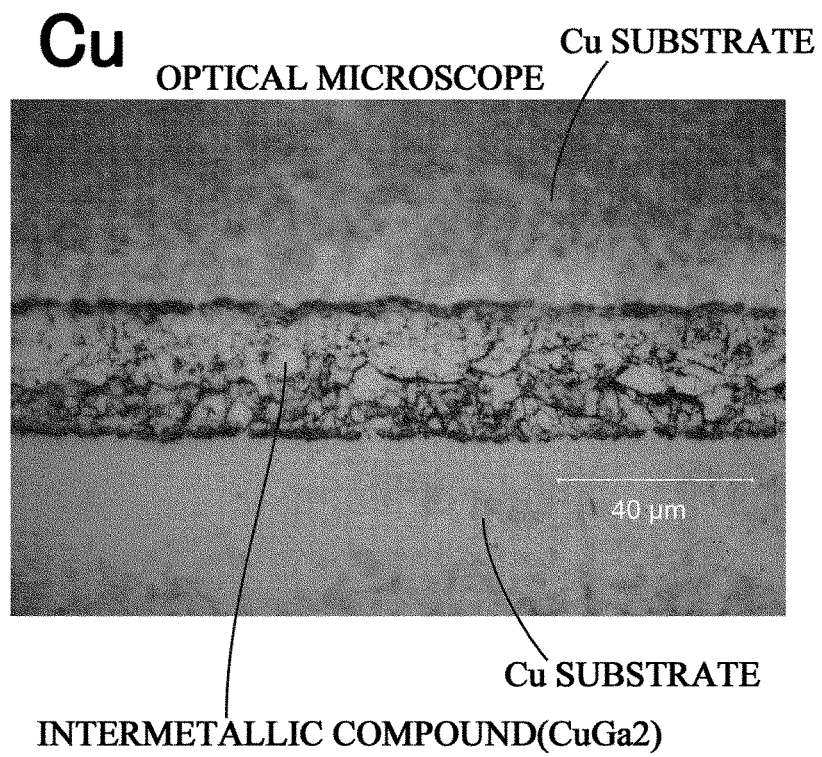

The solder layer of the solder joint part joined to the Cu substrates had a continuous phase including a number of voids crossing the intermetallic compounds, as illustrated in FIGS. 2A and 2B.

Figure 3A:
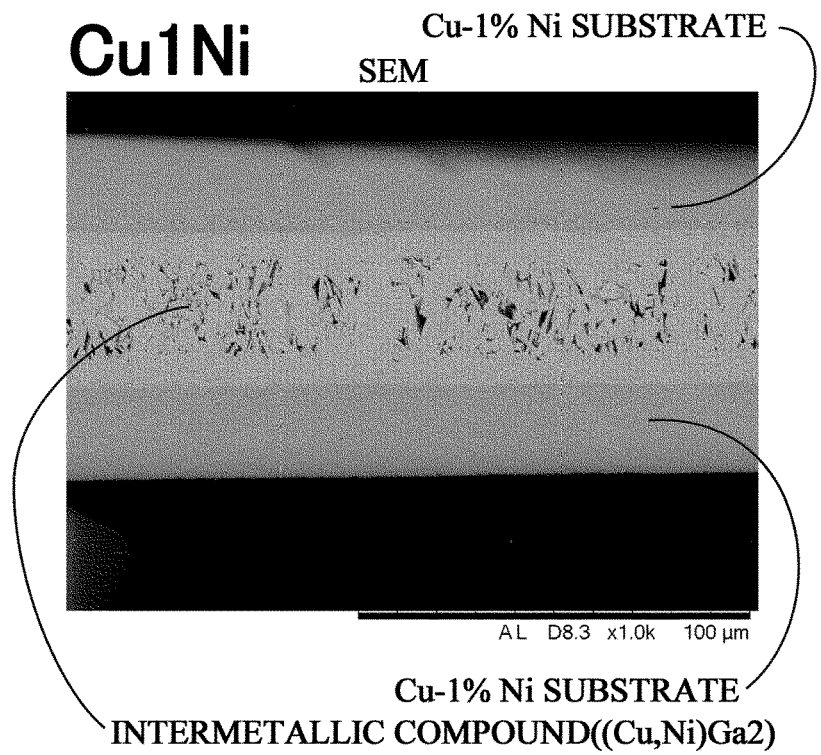
FIGS. 3A and 3B are sectional views of a solder joint part on a Cu-1% Ni substrate with the SEM.
Figure 3B:
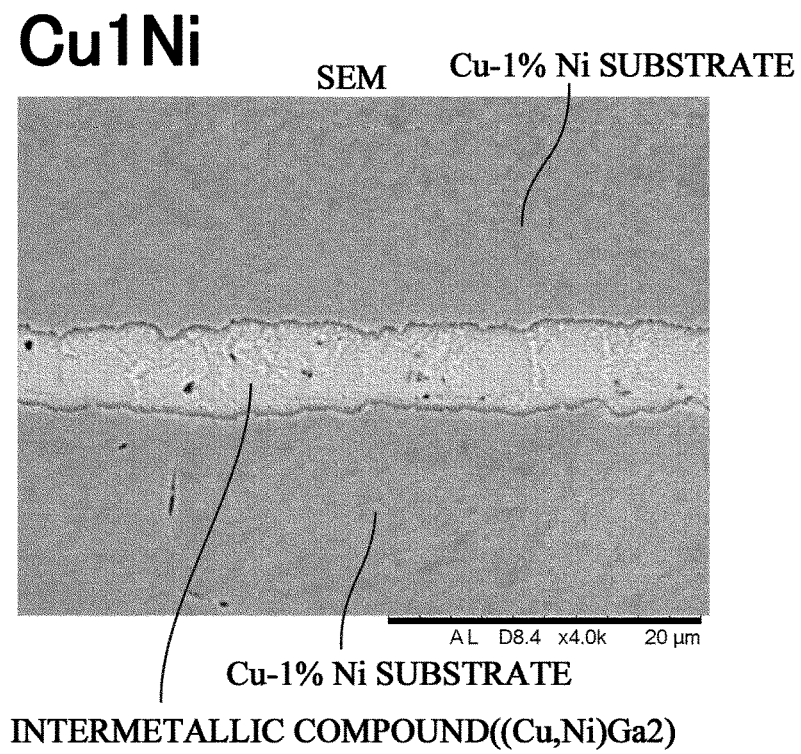

In the solder layer of the solder joint part joined to the Cu-1% Ni substrates, the intermetallic compound had a continuous phase, although voids exist, as illustrated in FIGS. 3A and 3B.

Figure 4A:
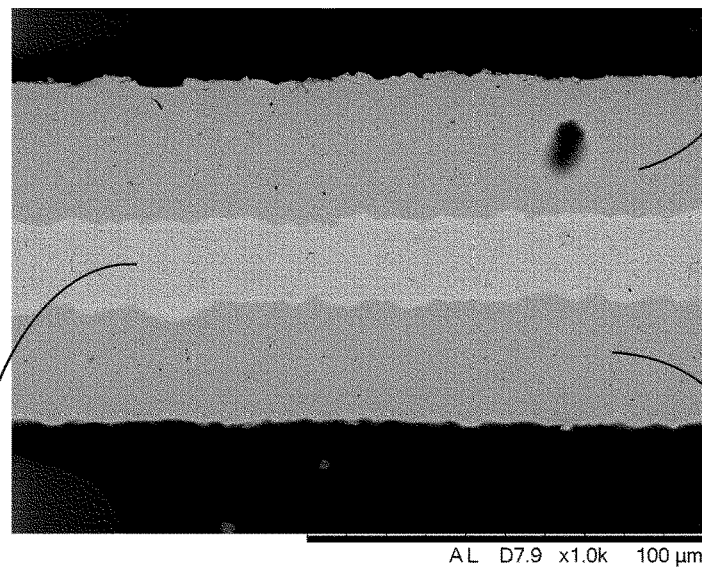
FIGS. 4A and 4B are sectional views of a solder joint part on a Cu-10% Ni substrate respectively with the SEM (FIG. 4A) and the optical microscope (FIG. 4B).
Figure 4B:
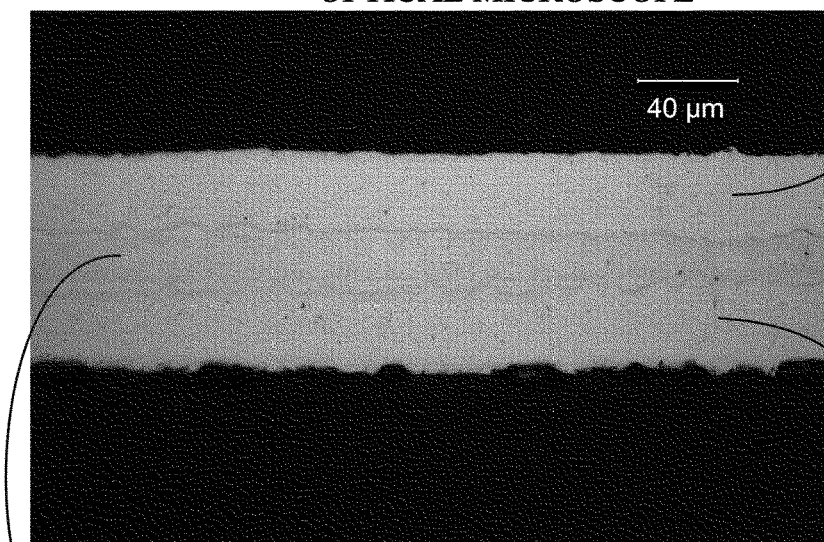

The solder layer of the solder joint part joined to the Cu-10% Ni substrates had a continuous phase including few voids, as illustrated in FIGS. 4A and 4B.

In addition, to check flexibility of each of the three types of solder joint parts described above, the portion around the solder joint part of the substrates was bent by hands. As a result, no separation occurred and the joint state was retained in all of the Cu substrates, and the Cu-1% Ni substrates, and the Cu-10% Ni substrates.

According to the results described above, the intermetallic compound CuGa$_2$ or (Cu, Ni)Ga$_2$ is formed in each of the solder layers of the solder joint parts joined to the Cu substrates, the Cu-1% Ni substrates, and the Cu-10% Ni substrates. Therefore, each of the solder joint parts has flexibility, and electrical connection is maintained even when the substrate is deformed.

In addition, the solder layers of the solder joint parts joined to the Cu-1% Ni substrates and Cu-10% Ni substrates have few voids. Therefore, the solder joint parts have more excellent electrical conductivity in addition to an excellent mechanical property.

Test Example 1: SEM Observation of Intermetallic Compounds Formed on Cu Substrate To prevent oxidization, a Ga/Cu substrate sample was prepared in an Ar atmosphere (O$_2$<0.10 ppm, H$_2$O<0.10 ppm, pressure of 4.40 Mbar, 25 to 26° C.) in a globe box by the following process.

First, the Cu substrates (purity of 99.9%, 30×10×3 mm, 0.875 g) were cleaned with a commercially available zinc chloride/hydrochloric acid-based flux to remove an oxide and other contaminants, and thereafter rinsed with ethanol to be prepared.

Liquid Ga was prepared by heating solid Ga (99.9%, 20 g) at approximately 40° C. to a liquid state using a hot plate. Thereafter, the liquid Ga alloy (1.5 g) was dropped onto different Cu substrates using a pipette.

Thereafter, the structure was left at 25° C. for 72 hours in an Ar atmosphere in a globe box to promote interface reaction between the liquid Ga drops and the Cu substrates, and an intermetallic compound (Ga—Cu IMC) was formed in the contact interface. After the leaving period, the structure was cleaned with a 10 wt % HCl diluted solution to remove un-reacted Ga, with the Ga—Cu IMC being left on the Cu substrates.

The state of Ga—Cu IMC on the Cu substrates was observed using a SEM.

Specifically, to observe the reaction interface between the Ga—Cu IMC and the Cu substrate, a sample was buried in an epoxy resin and polished. Thereafter, the sectional microstructure was observed with the SEM.

"Hitachi™ 3030 SEM" was used as the SEM. Electronic probe micro-analysis (EPMA) was executed with "JEOL JXA-8200".

Figure 5A:
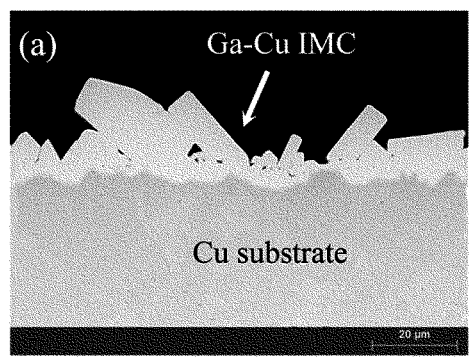
FIG. 5A illustrates a SEM image of a Ga—Cu intermetallic compound (IMC) layer on a Cu substrate in Test Example 1.

As illustrated in FIG. 5A, in the SEM image, the Cu substrate was covered with a continuous Ga—Cu IMC layer (hereinafter also referred to as "IMC layer"), and an uneven Cu interface was observed.

Figure 5B:
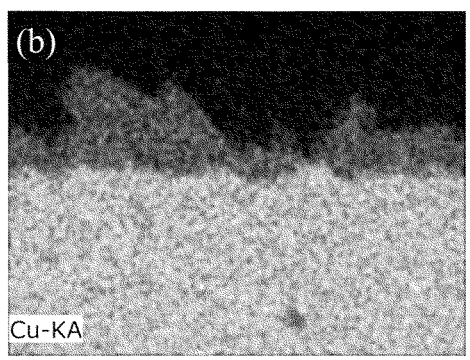
FIGS. 5B and 5C illustrate results of elemental mapping with an energy dispersive X-ray spectrometer (EDS) for a Ga—Cu IMC/Cu bonding interface.
Figure 5C:
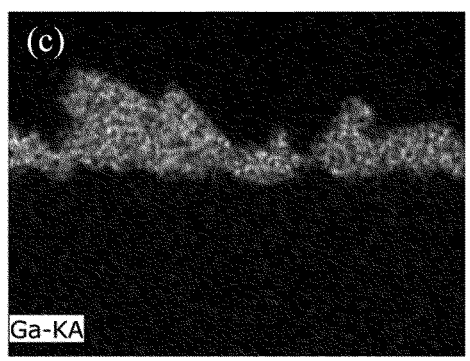

FIGS. 5B and 5C illustrate the results of EDS elemental mapping of the Ga—Cu IMC/Cu connection interface section.

The results of the EDS point analysis illustrate that the Ga—Cu IMC is formed of Cu and Ga having a Cu/Ga atomic ratio of 2/1 and the most possible constituent component of the Ga—Cu IMC is "CuGa$_2$".

Test Example 2: X-Ray Diffraction (XRD) Measurement of Ga—Cu IMC Powder

Measurement of the lattice constant of CuGa$_2$ by synchrotron X-ray diffraction was executed with a powder diffraction beam line of a synchrotron in Australia.

Ga—Cu IMC on the Cu substrate prepared in Test Example 1 was scraped off with a sharp cutting tool, and the obtained powder was collected and put into a quartz capillary having an internal diameter of 100 μm and a wall thickness of 10 μm.

Thereafter, the quartz capillary filled with the sample powder was placed on a rotary sample stage, and aligned with a goniometer.

Measurement was performed using a 16 keV monotonous incident beam under an atmospheric pressure for every 10° C. over a temperature range of −100° C. to 200° C.

The optical system for synchrotron X-ray diffraction was calibrated by measuring a standard LaB$_6$ sample (NIST660b, a=4.15689 Å, Pm 3 μm, grain size of 2 to 40 μm) in a 100 μm capillary at a room temperature.

Figure 6:
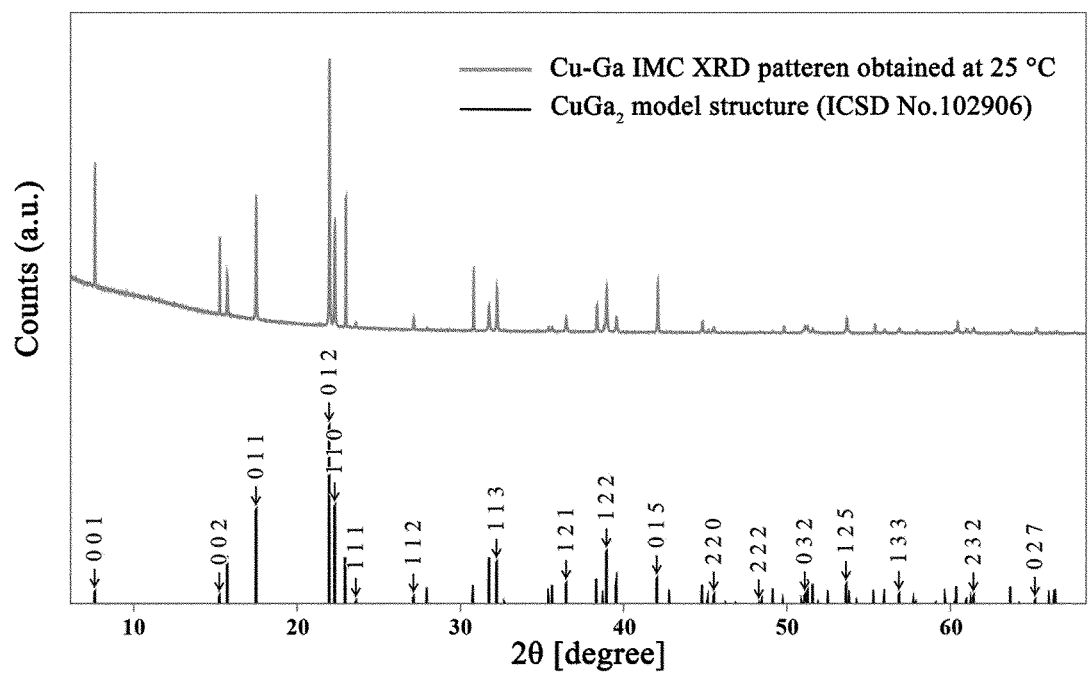
FIG. 6 illustrates an indexed result of a synchrotron XRD pattern of Ga—Cu IMC powder in Test Example 2.

FIG. 6 illustrates indexed results of a pure Ga—Cu IMC powder synchrotron XRD pattern acquired at 25° C. A phase analysis proved that the only Ga—Cu IMC formed between pure Ga prepared at a room temperature and the Cu substrate was CuGa$_2$.

Test Example 3

Figure 7A:
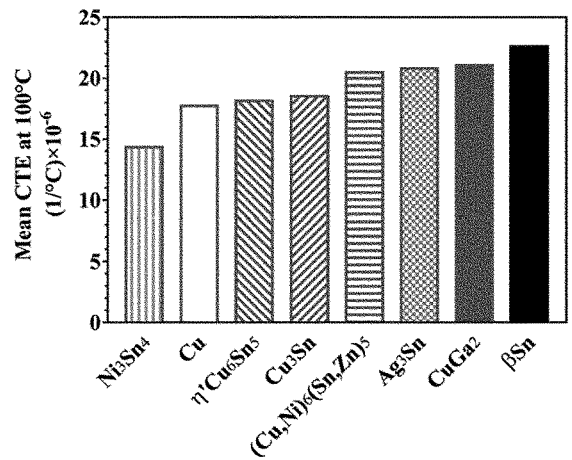
FIG. 7A illustrates an average coefficient of thermal expansion (CTE) at 100° C. in Test Example 3.
Figure 7B:
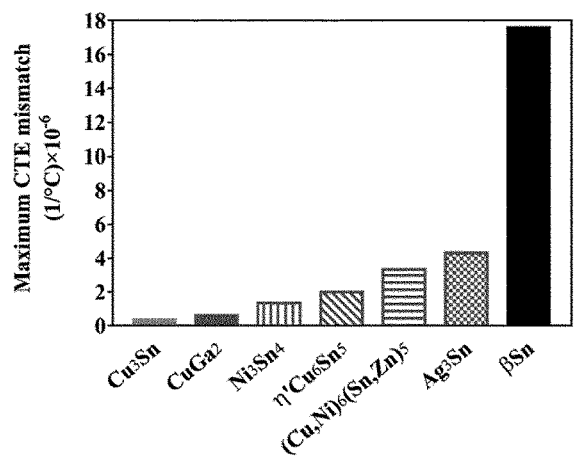
FIG. 7B illustrates the maximum CTE mismatch.
Figure 7C:
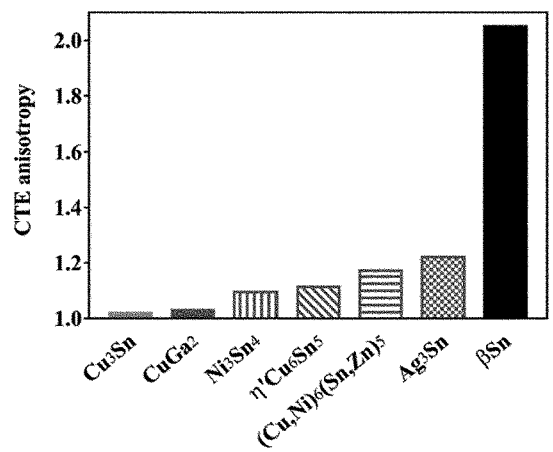
FIG. 7C illustrates CTE anisotropy of $CuGa_2$, βSn, and main solder IMCs at 100° C. The data of βSn and the main solder IMCs are publicly known data.

Mean coefficient of thermal expansion (CTE), CTE anisotropy (E1/E3), and maximum CTE mismatch (E1-E3) of CuGa$_2$ existing in the solder joint part were measured through publicly known methods using the sample prepared in Test Example 2. Results obtained in comparison with βSn and important IMC phases are shown in FIG. 7.

The data of βSn and important IMC phases are publicly known data.

Both CuGa$_2$ and βSn have a tetragonal crystal structure. Here, CuGa$_2$ is characterized by the markedly small mismatch and anisotropy of the CTE.

In addition, it is known that most of ordinarily-used substrate materials including Cu, Au, Ag, Ni, and Al have a tetragonal crystal structure, and exhibit isotropy in their elasticity and thermal property. By contrast, CuGa$_2$ having a substantially isotropic crystal structure more agrees with the thermal expansion property of the aforementioned ordinallyused substrate materials than βSn serving as an IMC formed in the case of using lead-free solder and/or the other IMCs. This proves that the CuGa$_2$/Cu joint part has more excellent thermomechanical reliability than that of a joint part formed of conventional lead-free solder.

Test Example 4: Nano-Indentation Hardness

The nano-indentation test was executed in Triboindenter (Hysitron Inc., Minneapolis, MN) including a three-face Berkovich indenter having a nominal distal end radius of 100 nm and a total interior angles of 142.3°.

Before the test, the indenter was calibrated using a standard sample (quartz).

During the pressing, the loading time, the retaining time, and the unloading time were fixed at 10 seconds, 10 seconds, and 15 seconds, respectively for all the tests.

The load-displacement (P-h) curve was recorded.

The form of the track of indentation was characterized using an atomic force microscope (AFM) by in situ observation.

Figure 8A:
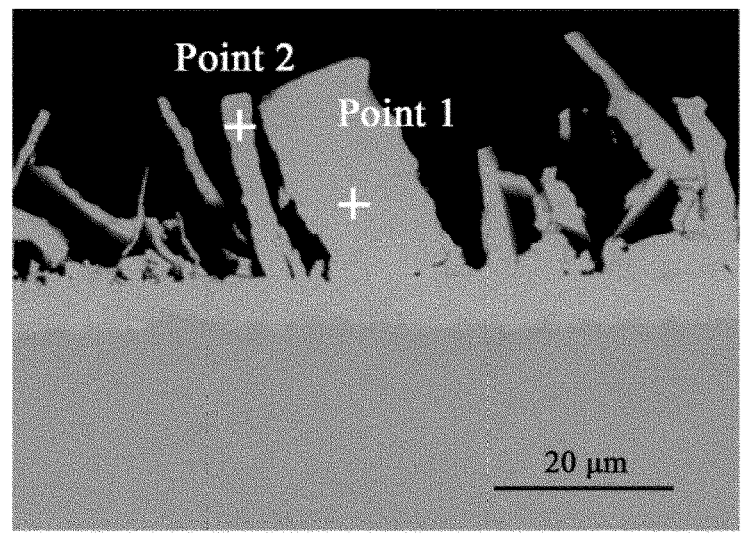
FIGS. 8A, 8B, and 8C illustrate a SEM image illustrating positions in a sample in which nano-indentation measurement was performed (FIG. 8A), and Electron Backscatter Diffraction Patterns (EBSD) Kikuchi patterns of $CuGa_2$ in each indentation measurement position (FIGS. 8A and 8C).
Figure 8B:
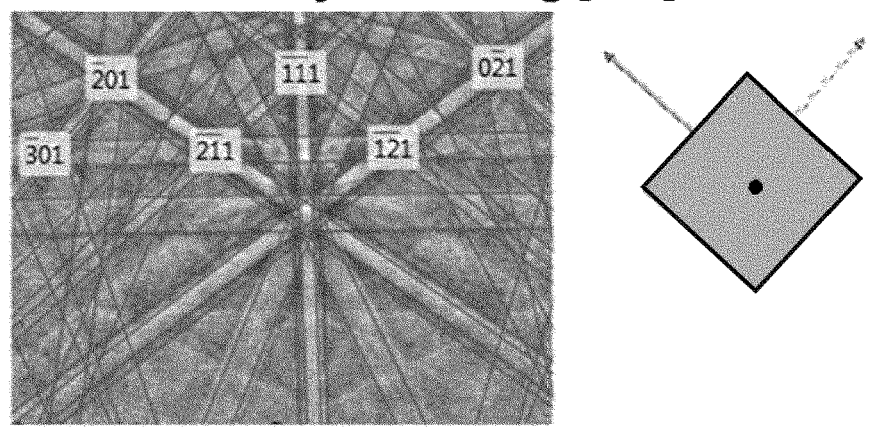
Figure 8C:
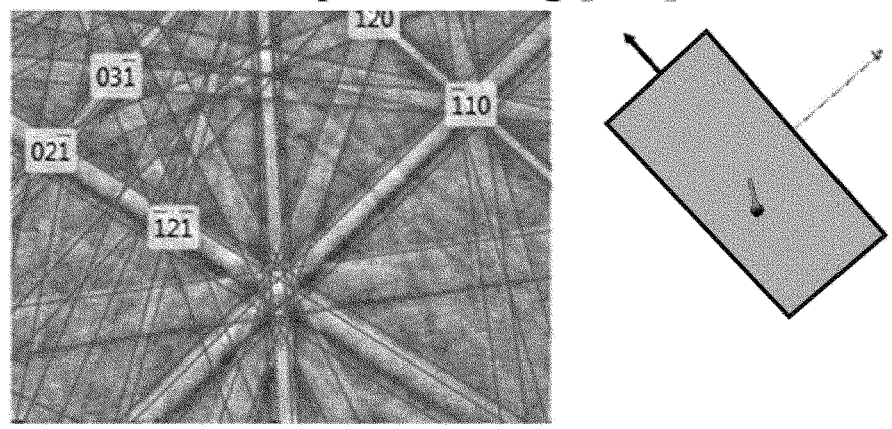

Depending on the stress distribution in the joint part, the hardness of the IMC is one of the factors having influence on reliability of the solder joint part being used. The nano-indentation method is used to distinguish the hardness of CuGa$_2$ in different directions, as illustrated in FIGS. 8A, 8B, and 8C. As illustrated in FIGS. 8B and 8C, indentation was performed along the [001] and [100] zone axes, respectively.

Figure 9:
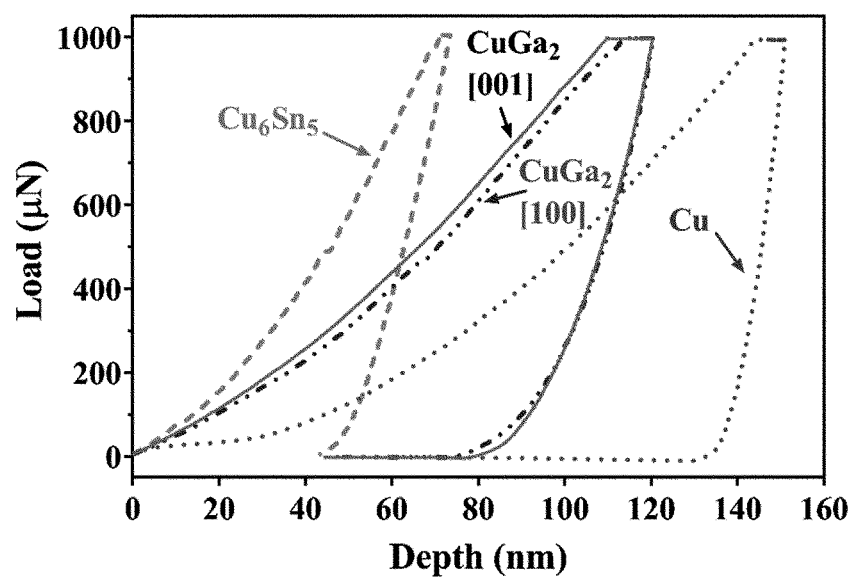
FIG. 9 illustrates results of nano-indentation load-displacement curves of the Ga—Cu IMC in Test Example 4.

FIG. 9 illustrates representative nano-indentation load-displacement curves of CuGa$_2$ and Cu$_6$Sn$_5$. A load-displacement curve of Cu is also included for comparison.

Figure 10A:
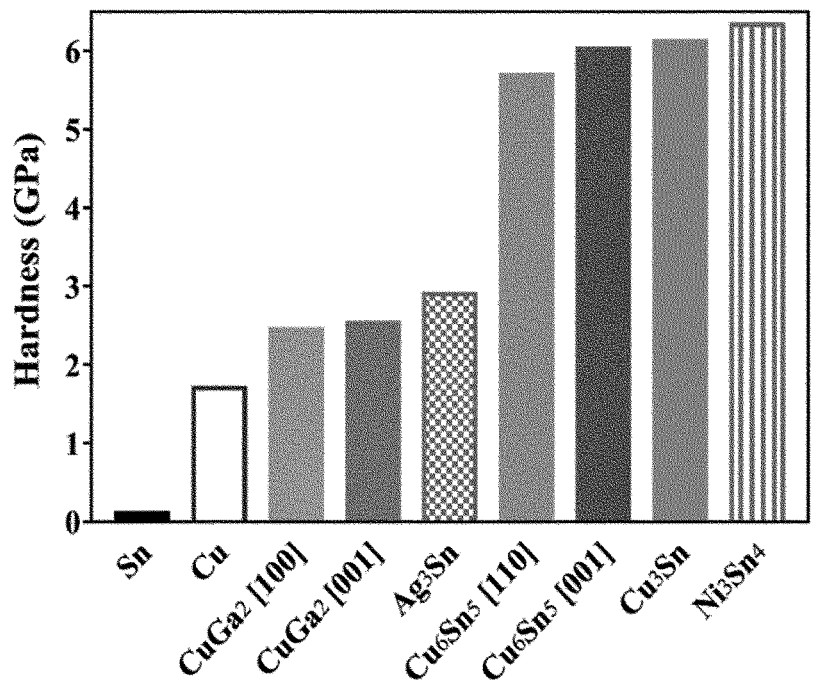
FIGS. 10A and 10B respectively illustrate hardness (FIG. 10A) and Young's modulus (FIG. 10B) of $CuGa_2$, Cu, Sn, and main solder IMCs in Test Example 4. The data of Cu, βSn, and the main solder IMCs are publicly known data.
Figure 10B:
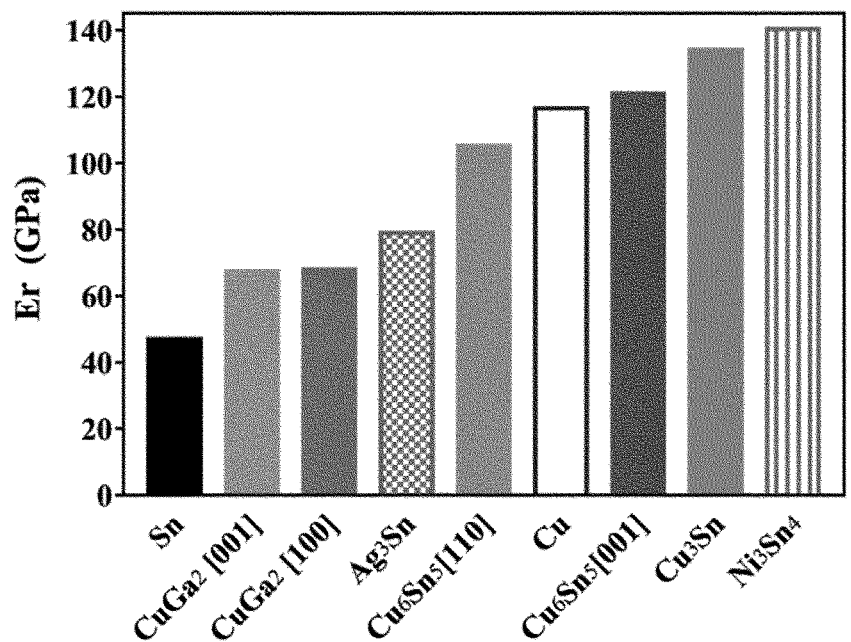

FIGS. 10A and 10B illustrate hardness (H) and Young's modulus (Er). In comparison with other IMCs generated in the solder joint part, the Young's modulus and the hardness of CuGa$_2$ are small, and it proves that this IMC phase has more softness and more flexibility.

Although the IMC phase formed using lead-free solder is generally fragile in many cases, the solder joint part formed of CuGa$_2$ is soft and has flexibility, and is therefore considered to be capable of absorbing, to a certain degree, the stress that may act on the joint part in use.

As mentioned above, the tendency in fragility may be concerned for the integrated circuit layer in which the IMC phase occupies the most part of the joint volume. However, if the solder joint part containing CuGa$_2$ is formed even in such a situation, a large advantage can be obtained.

In addition, CuGa$_2$ exhibited smaller anisotropy than that of Cu$_6$Sn$_5$, and CuGa$_2$ exhibited a more potential advantage than the IMC found in the joint part formed of a conventional solder alloy, also with respect to the elastic property.

The results of Test Examples 1 to 4 prove that CuGa$_2$ or (Cu, Ni)Ga$_2$ serving as the IMC generated between the first metal base material and the second metal base material is suitable as a main IMC of a very small solder joint part, in the case where at least one metal base material of the first metal base material and the second metal base material is an alloy having a Ni content of more than 0 wt % and less than 44 wt % and a Cu content of more than 56 wt % and the solder is a solder alloy formed of Ga and inevitable impurities or a solder alloy including Ga as a main component and having a melting point of 30° C. or lower.

Accordingly, Ga and Ga-based alloy forming an IMC in the interface with Cu can serve as a promising substitute for a conventional solder alloy forming Cu$_6$Sn$_5$ and Cu$_3$Sn intermetallic compounds.

Test Example 5

As the first metal base material and the second metal base material, Cu-xNi substrates (x was changed to 0, 2, 6, 10, and 14 wt %, width of 5 mm, length of 25 mm, thickness of 1 mm) were used. Portions of 5 mm of the substrates in the length direction were joined at 40° C. using Ga to obtain a joint sample (joint area: 5×5 mm) (12 samples were prepared for each of types, that is, 60 samples in total).

Thereafter, in the obtained joint samples, joint samples in which joint was succeeded were extracted and the tensile strength of the extracted joint was measured.

An AG-IS tensile tester manufactured by Shimadzu Corporation (strain rate of 0.5 mm/min, maximum load of 1,000N) was used for measurement of the tensile strength.

Table 1 illustrates the acquired results.

TABLE 1

| x (wt % Ni) | Number of tested samples | Average value of force (standard deviation) N | Average value of Strength (MPa) |
| --- | --- | --- | --- |
| 0 | 8 | 244 (82) | 9.8 |
| 2 | 12 | 302 (93) | 12.1 |
| 6 | 9 | 283 (67) | 11.3 |
| 10 | 11 | 309 (85) | 12.4 |
| 14 | 7 | 293 (107) | 11.7 |

According to the results of Table 1, the tensile strengths of the joint samples manufactured with the Cu-xNi substrates (x=2, 6, 10, and 14) were similar to each other, and fell within the range of 11.3 to 12.4 MPa. By contrast, the tensile strength of the joint sample manufactured with pure Cu was 9.8 MPa and slightly smaller than them.

It was proved that the joint strengths of the joint samples obtained as described above were sufficient strengths at the execution level.

Each of the samples had a very large standard deviation, and it was probably caused by uncontrolled pore formation.

Test Example 6

The intermetallic compounds (IMC) formed in the interface between Ga and the Cu substrate or the Cu-10Ni substrate were investigated by the following process.

To prevent oxidization, samples were prepared under an argon atmosphere in a globe box (O$_2$<0.10 ppm, H$_2$O<0.10 ppm, pressure of 4.40 Mbar, 25 to 26° C.).

A Cu foil and a Cu-10 wt % Ni foil (each having a size of (length)×10 (width)×0.03 mm (thickness)) were used as the metal substrates.

After the metal substrates was cleaned with a commercially available zinc chloride/hydrochloric acid-based flux, an oxide and other contaminants were removed using ethanol to prepare samples.

Samples of Ga/substrates (Cu or Cu-10Ni) were prepared by heating a Ga ingot (99.9%, 20 g) at approximately 40° C. to a liquid state.

Subsequently, liquid Ga (0.3 g) was dropped onto each of the substrates with a transfer pipette.

Thereafter, the samples were kept for 5 to 142 hours in an anneal oven at 30±3° C. such that interface reaction between the liquid Ga drops and the clean Cu substrates advances.

After the reaction, the two samples were cleaned with a 10 wt % HCl diluted solution to remove excessive Ga, with the formed IMC kept adhering to the substrate.

The following is an outline of the executed test methods.

The IMC microstructure was observed with a SEM and an EDS using a Hitachi™ 3030 machine, from both an etched top view and a section of the IMC/substrate interface.

Electron probe microanalysis (EPMA) was executed with a JEOL JXA-8200 machine.

Synchrotron X-ray diffraction (XRD) was executed using an incident beam of 15 keV with a powder diffraction beam line of a synchrotron of Australia.

XRD observation was executed for both of IMC powder using a capillary and the IMC/substrate using a transmission mode. To observe the powder sample, the IMC on the substrate was scraped off with a sharp blade, and the obtained powder was collected and put into a quartz capillary having an internal diameter of 300 µm. Thereafter, the capillary sample was placed on a rotary sample stage, and aligned with a goniometer.

Measurement was performed under an atmospheric pressure for every 20° C. over a temperature range of 25° C. to 300° C. at heating speed of 6° C./min.

The temperature during measurement was controlled using a hot air blower.

The optical system of synchrotron XRD was calibrated by measuring a standard $LaB_6$ sample (NIST 660b, a=4, 15689 Å, Pm 3 µm, grain size of 2 to 40 µm) at a room temperature.

Rietveld analysis was performed using TOPAS 4.2 (Bruker-AXS, Germany) to perform refinement with both a standard $LaB_6$ sample and the IMC powder sample.

Phase identification of the IMC powder was performed with support of the inorganic crystal structure database (ICSD). Synchrotron radiation wavelength calibration, 2θ zero error, and the system configuration function were corrected in accordance with the standard sample pattern.

The peak shape of the XRD pattern was described using fundamental parameter (FP) approach, and the background, the sample displacement correction, and the scale factor were individually adjusted for each of the patterns.

The temperature-dependent d distance and the lattice constant were acquired by improving the diffraction pattern.

More detailed study relating to the microstructure analysis of the interface was executed using a transmission electron microscope (TEM).

A thin-film sample having a thickness of approximately 100 nm was prepared on a Si grid using a focused ion beam (FIB, FEI Scios) method.

Before TEM observation, the damaged layer formed on the sample surface was removed by argon ion milling with a voltage of 900 eV (Fischione Nano Mill Model 1040).

A scanning transmission electron microscope (STEM, JEM ARM200F) was operated at an acceleration voltage of 200 kV.

Bright field (BF) and high-angle annular dark field (HAADF) imaging was executed.

In order to prevent image drift, a plurality of high-speed acquisitions and superimposition of images were executed.

An atomic resolution EDS map was acquired with a size of 256×256 pixels.

Selected area electron diffraction pattern (SADP) was acquired in a TEM mode.

Figure 11A:
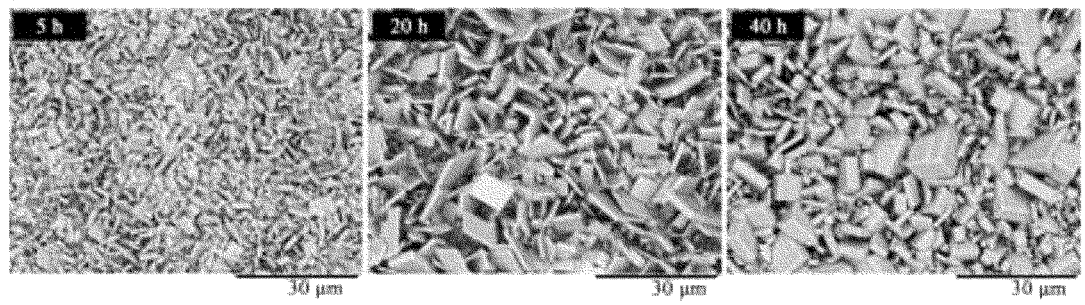
FIGS. 11A and 11B illustrate top view backscatter electron (BSE) images of the IMC on the metal substrate after contact with Ga for 5 to 40 hours at 30° C. in Test Example 6.
Figure 11B:
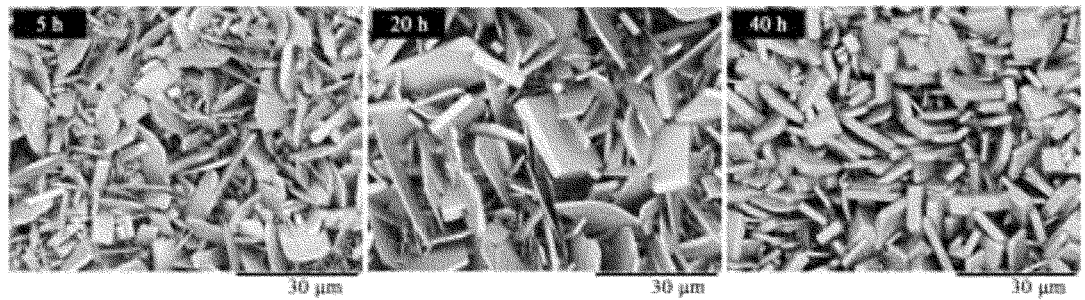

FIGS. 11A and 11B illustrate forms of the top view of IMCs on the Cu substrates and the Cu-10Ni substrates after contact with Ga for 5 to 40 hours at a room temperature.

According to the results illustrated in FIGS. 11A and 11B, highly faceted IMC particles were grown on both the Cu substrates and the Cu-10Ni substrates. The IMC particles on the Cu substrates were smaller than the IMC particles on the Cu-10Ni substrates.

This illustrates that the manufacturing method of the present invention enables adjustment of the size of the IMC particles to further increase in size, in comparison with the Ni content in the Cu substrates.

Figure 12A:
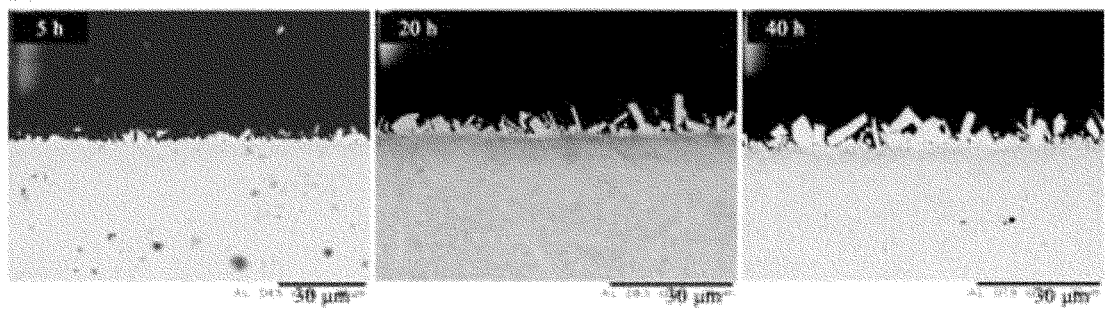
FIGS. 12A and 12B illustrate backscatter electron (BSE) images of sectional samples in Test Example 6.
Figure 12B:
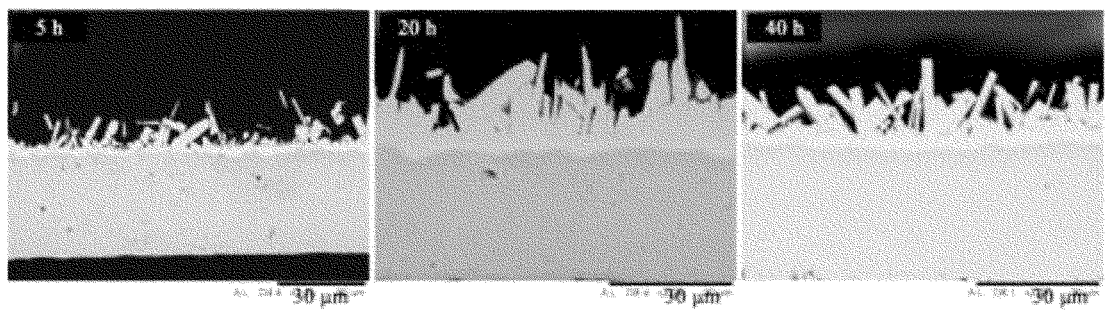

The difference in IMC particle size was clarified also from sectional observation illustrated in FIGS. 12A and 12B.

In addition, an uneven boundary was formed between the IMC and the Cu-10Ni substrates in FIG. 12B.

By contrast, a comparatively smooth line indicating the original liquid Ga/substrate interface was found in the IMC region.

Because the atomic numbers of Ga (31), Cu (29), and Ni (28) are extremely close to each other, the contrast of the IMC region in the backscatter image is extremely low.

As illustrated in FIG. 13, the contrast was more easily distinguished in EDS mapping and line scanning.

Figure 13A:
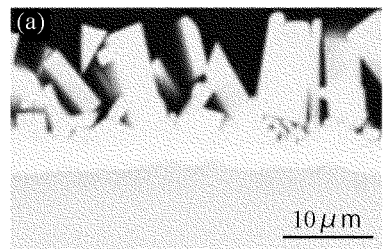
FIG. 13A illustrates a SEM backscatter image of IMC on the Cu-10Ni substrate.
Figure 13B:
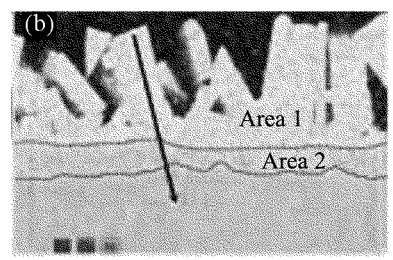
FIGS. 13B, 13D, 13E, and 13F illustrate results of EDS elemental mapping.
Figure 13C:
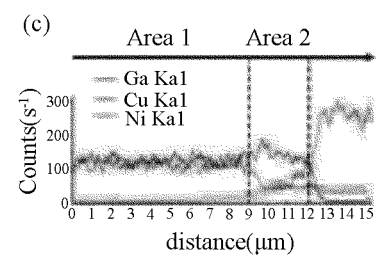
FIG. 13C illustrates a result of line scanning.
Figure 13D:
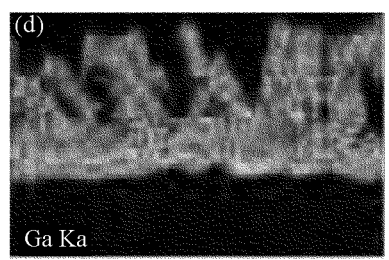
Figure 13E:
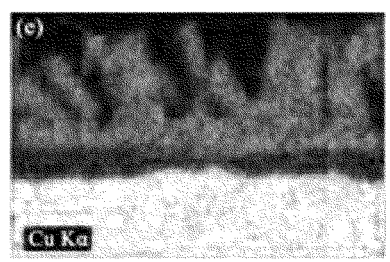
Figure 13F:
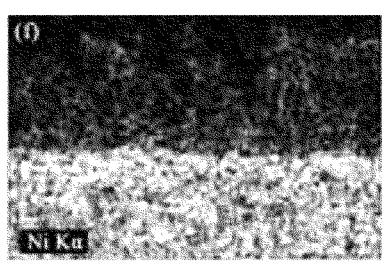

The IMC area was classified as Area 1 mainly including Ga and Cu and Area 2 (area between the original interface and the IMC/substrate interface) (FIG. 13C).

To acquire more accurate composition information relating to the IMC, analysis using EPMA was adopted, and analysis results are summarized in Table 2.

TABLE 2

|  | Ga (at. %) | Cu (at. %) | Ni (at. %) |
| --- | --- | --- | --- |
| Area 1 | 63.81 ± 0.18 | 35.35 ± 0.24 | 0.84 ± 0.11 |
| Area 2 | 77.69 ± 1.25 | 10.60 ± 1.42 | 11.71 ± 1.00 |

According to the results listed in Table 2, the IMC of Area 1 and the IMC of Area 2 are significantly different in ratios of Cu and Ni. This shows different intermetallic compounds are formed in the respective IMCs in Areas 1 and 2.

The main IMC formed as a Ga/Cu based compound is $CuGa_2$. As illustrated in FIGS. 14A, 14B, 14C, and 14D, a thin layer of $\gamma_3$-$Cu_9Ga_4$ ($Cu_{7.15}Ga_{5.85}$) was grown between $CuGa_2$ and Cu.

However, the thickness (30° C.) of this layer in the experiment was much smaller than the size of $CuGa_2$ particles.

The thickness of $\gamma_3$-$Cu_9Ga_4$ layer was approximately 0.1 µm (FIG. 14B) and approximately 0.25 µm (FIG. 14D) in comparison with the thickness after liquid Ga contacts Cu for 70 hours and 142 hours.

Figure 14A:
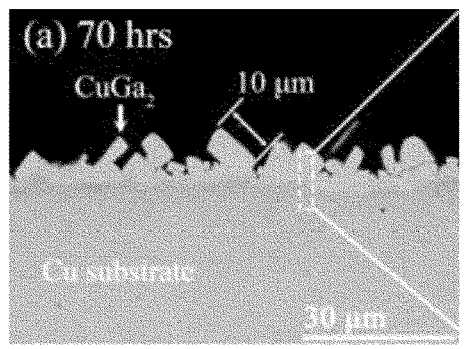
FIG. 14A illustrates a SEM image of a Ga/Cu interface with the reaction time of 70 hours in Test Example 6. The rectangle in FIG. 14A illustrates a TEM observation region in FIG. 14B.
Figure 14B:
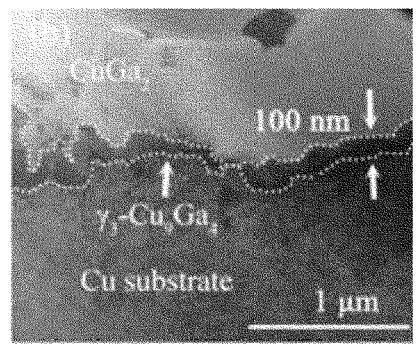
FIG. 14C illustrates a SEM image of the Ga/Cu interface with the reaction time of 142 hours in Test Example 6. The rectangle in FIG. 14C illustrates a TEM observation region in FIG. 14D.
Figure 14C:
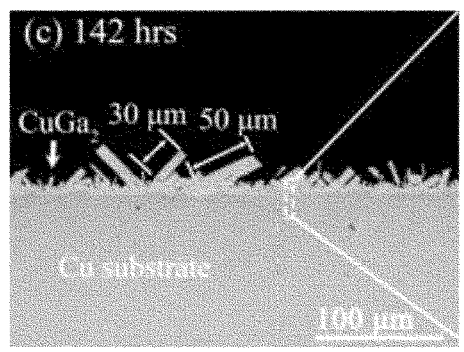
Figure 14D:
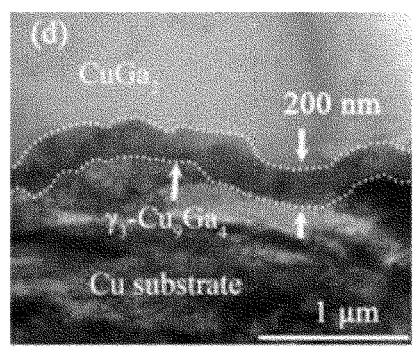

$CuGa_2$ particles were approximately 10 µm (FIG. 14A) and approximately 30 µm (FIG. 14C).

Figure 15:
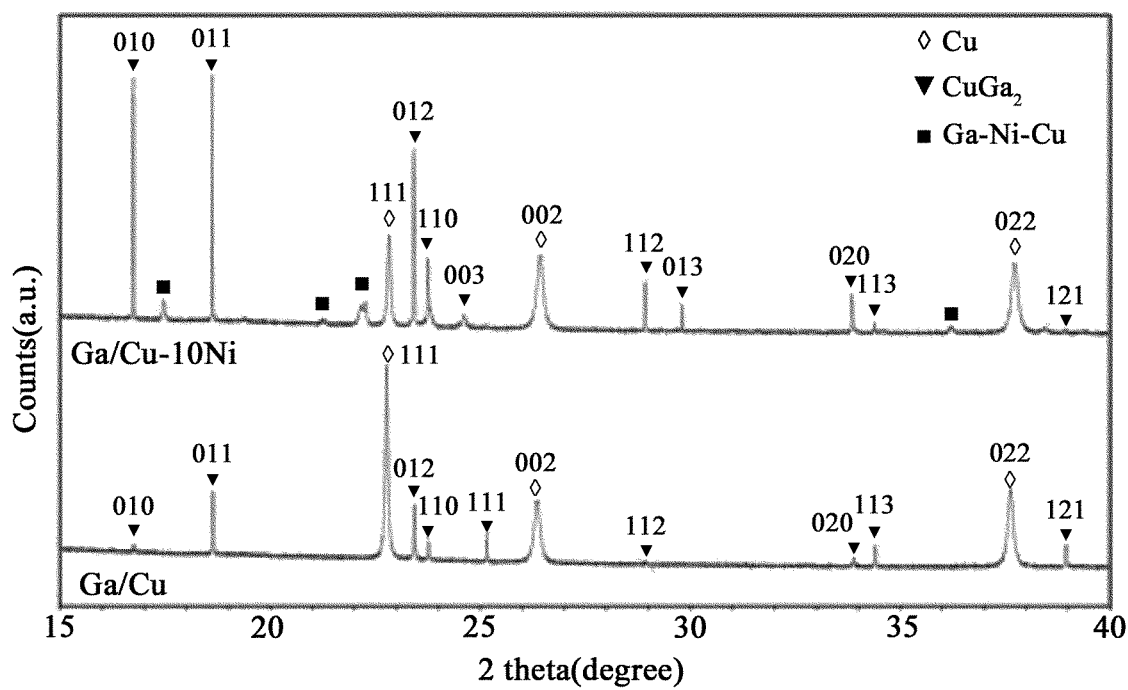
FIG. 15 illustrates synchrotron transmission XRD patterns of a Ga/substrate IMC at 25° C. on the Cu substrate (lower) and the Cu-10Ni substrate (upper) in Test Example 6.

FIG. 15 illustrates a transmission XRD pattern through the IMC on the Cu substrates.

Only Cu and $CuGa_2$ were detected.

Accordingly, it proved that most of the grown part in the intermetallic compounds corresponds to $CuGa_2$ as a Ga/Cu based compound. It is proved that reaction between the metals described above is based on the reaction formula of:

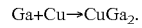

$$Ga+Cu \rightarrow CuGa_2.$$

As illustrated in FIG. 13, the thickness of Area 2 cannot be ignored in view of the thickness of $CuGa_2$ of Area 1.

As illustrated in FIG. 15, this is also supported by transmission XRD analysis through the IMCs on the Cu-10Ni substrates. In FIG. 15, extra peaks (red rectangles) other than Cu and $CuGa_2$ were detected.

Figure 16A:
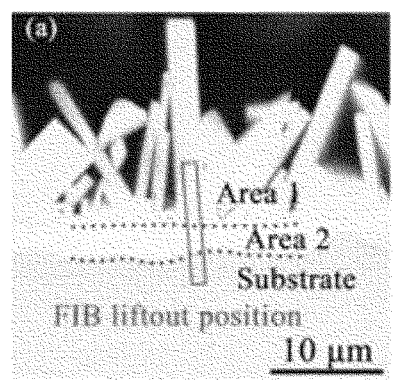
FIG. 16A illustrates a backscatter SEM image of the IMC/Cu-10Ni couple sample in Test Example 6. A FIB sample was obtained from the interface region.

As illustrated in FIG. 16A, TEM samples from the IMC/Cu-10Ni interface including Area 1, Area 2, and the substrate were prepared by FIB. A BF image of FIB lamella of FIG. 16B clearly illustrates IMC Area 1, IMC Area 2, and the Cu-10Ni substrate region.

Figure 16B:
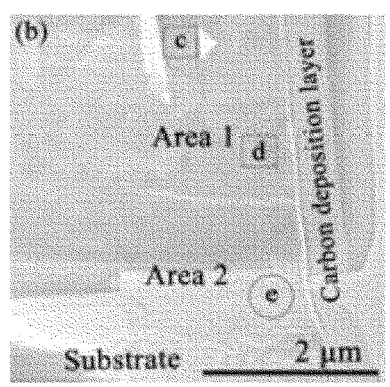
FIG. 16B illustrates a transmission bright field at a low magnification of a FIB device, in which a red circle illustrates a selected region of a diffraction pattern.

As illustrated in Area 1 of FIG. 16B, CuGa$_2$ particles exhibited a flaky form in a micrometer scale.

Figure 16C:
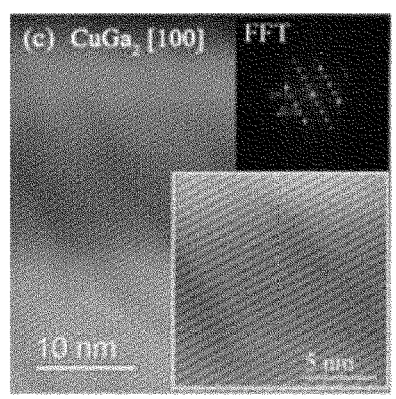
FIGS. 16C and 16D illustrate high-resolution HAADF images of Area 1 in which a FFT pattern exists in zone axes [100] and [001] after inclination, respectively.
Figure 16D:
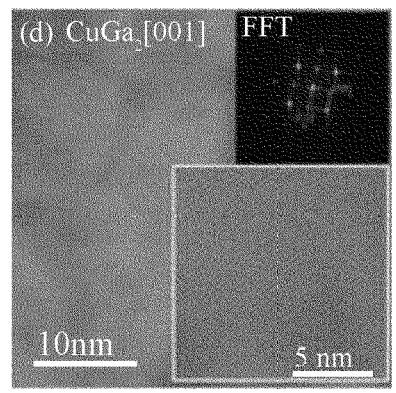

Each of FIGS. 16C and 16D illustrates a high-resolution HAADF image of Area 1 after inclination and corresponding fast Fourier transform (FFT) patterns.

The particles exist in the same direction, and each of the zone axes [100] and [001] of CuGa$_2$ is aligned along the incident electron beam direction.

As illustrated in the FFT pattern, superlattice reflection occurred.

Figure 16E:
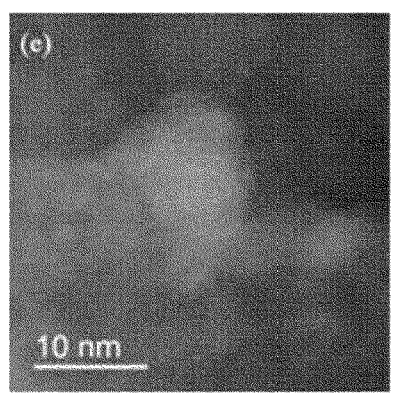
FIG. 16E illustrates a high-resolution HAADF image of Area 2.

In the IMC Area 2, the particles were in a nano scale, as illustrated in FIG. 16E.

SADP was taken in a place illustrated with a red circle in FIG. 16B.

Figure 16F:
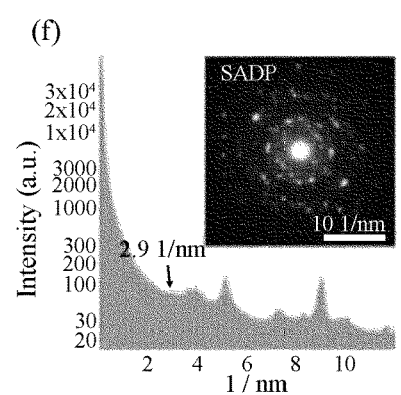
FIG. 16F illustrates SADP and strength of Area 2.

FIG. 16F illustrates SADP of the polycrystalline region and the diffracted strength.

As listed in Table 2, according to the results of EPMA, Area 2 includes Ni of 11.71 at %. There are some possible Cu—Ga and Ga—Ni IMC phases that may be formed of the three-components, and the Ga concentration described above was close to the reported Ga$_4$Ni (Ga$_{3.62}$Ni$_{0.97}$) phase. In consideration of the rotation mean intensity, the XRD result, and EPMA analysis of SADP, Ga$_4$(Ni, Cu) may be a promising phase.

The reaction formula of Ga/Cu-10Ni was as follows.

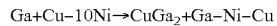

Figure 17:
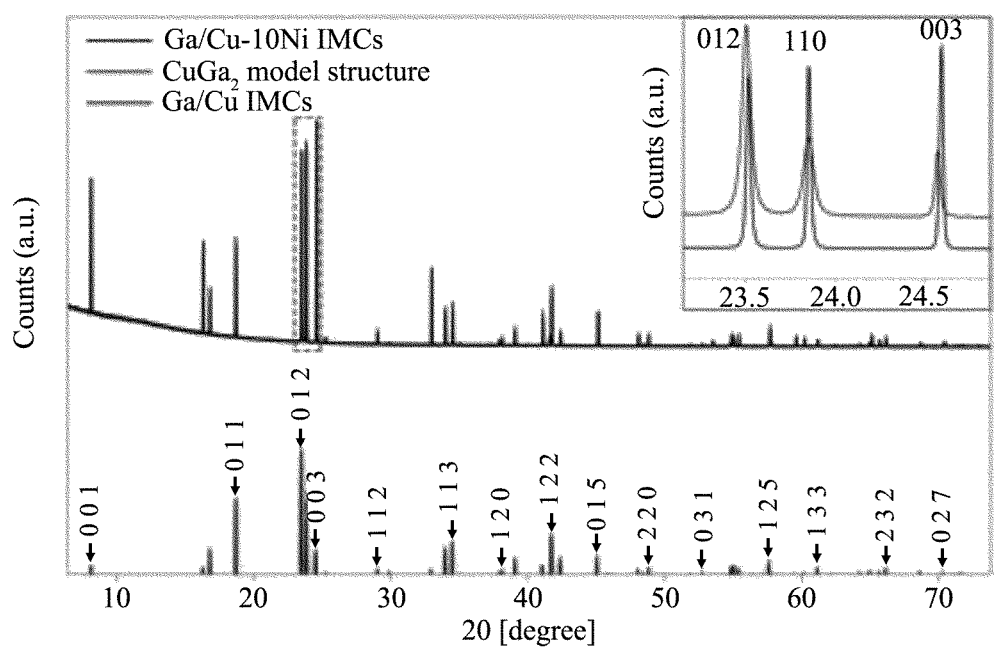
FIG. 17 is a graph illustrating results of the synchrotron XRD pattern index of Ga/Cu-10Ni IMC at 25° C. in Test Example 6. The red spectrum illustrates a publicly known $CuGa_2$ model structure, and the black and the blue spectra illustrate Ga/Cu-10Ni and Ga/Cu IMC experimental patterns, respectively. A pattern obtained by enlarging a 2θ range from 23° to 25° are illustrated inside FIG. 17.

FIG. 17 illustrates index results of a Ga/Cu-10Ni IMC powder synchrotron XRD pattern acquired at 25° C.

Analysis proved that CuGa$_2$ was the only IMC collected from the Cu-10Ni substrates by the scratch method at a room temperature. Ga/Cu IMC powder was also observed. In the enlarged insert, it was clear that the peak of the CuGa$_2$ of the Ga/Cu-10Ni system was shifted in comparison with CuGa$_2$ of the Ga/Cu system. This indicates the difference in crystal lattice parameters due to Ni doping.

In addition, when complete pattern Rietveld refinement of CuGa$_2$ was performed at 25° C. and in a 2θ range of 0 to 80°, the accuracy of the lattice constant acquired by refinement was clearly reflected by the fact that the refined and measured profile changes only according to the magnitude of the peak illustrated in the enlarged insert.

Table 3 summarizes the crystallographic parameters and the weighted profile R factor Rwp acquired at 25° C. It is understood that CuGa$_2$ formed at a room temperature has a tetragonal crystal structure with a space group P4/mmm. In addition, in comparison with CuGa$_2$ formed on the Cu substrate, CuGa$_2$ formed on the Cu-10Ni substrate had a smaller a axis and a smaller c axis.

In addition, CuGa$_2$ formed on the Cu substrate generated reaction to form γ$_3$-Cu$_9$Ga$_4$ and Ga, when the temperature increases to 260° C. to 300° C.

Accordingly, when Ni is included in the Cu substrate, the state is retained even under a condition where the formed IMC is exposed to a high temperature.

Example 2

Solder joint using a HCl aqueous solution was performed by the following process.
1) A Ga ingot and a 5% HCl aqueous solution were heated to 35 to 40° C. using water bath.
   The Ga ingot melted and became liquid Ga.
2) Lines were drawn on each of Cu-xNi sheets (x=0, 2, 6, 10, 14%, length of 25 mm, width of 5 mm, thickness of 1 mm) using a permanent marker to distinguish a region (5 mm×5 mm) of 5 mm from the end portion as a joint region.
3) Each Cu-xNi sheet was immersed in a 5% HCl aqueous solution.
4) The liquid Ga was dropped onto the first Cu-xNi sheet to wet the joint region of 5×5 mm. Thereafter, extra Ga was absorbed back with a pipette to leave a thin Ga layer adhering onto the surface of the first CuxNi sheet. Ga did not cross over the line formed with the permanent marker or the end of the first Cu-xNi sheet, so as not to naturally wet a region other than the joint region. The process described above was repeated in the second Cu-xNi sheet, and the first and the second Cu-xNi sheets were kept immersed in the HCl solution.
5) While the first and the second Cu-xNi sheets were immersed in the HCl solution, the Ga-applied regions of the two Cu-xNi sheets were joined to be opposed to each other using tweezers to obtain the solder joint part (Cu-xNi/Ga/Cu-xNi).
6) The solder joint part was extracted from the HCl solution, and rinsed with ethanol at a room temperature. When the ethanol was vaporized and the temperature was lowered, Ga of the solder joint part was rapidly solidified.
7) In order to promote growth of the IMC in the solder joint part, samples of the solder joint part were put into an annealing oven of 30±3° C. for 7 days. In addition, stationary clips were used to apply pressure to the solder joint part during annealing.

Example 3

Solder joint was performed under an argon atmosphere by the following process.

TABLE 3

| Substrate | Phase | Pearson symbol | Space group | Cell parameters (Å) | T (° C.) | Volume (Å$^3$) | Rwp |
|---|---|---|---|---|---|---|---|
| Cu | CuGa$_2$ | tP3 | P4/mmm | a = 2.8303<br>c = 5.8298 | 25 | 46.702 | 5.787 |
| Cu—10Ni | CuGa$_2$ | tP3 | P4/mmm | a = 2.8295<br>c = 5.8244 | 25 | 46.631 | 7.999 |

Figure 18A:
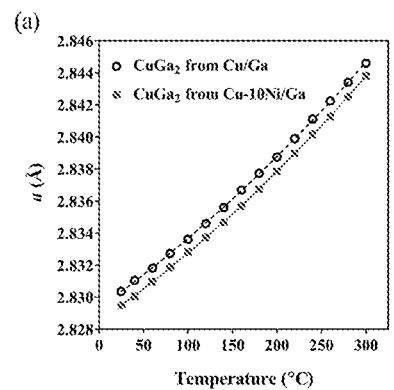
FIGS. 18A, 18B, and 18C illustrate lattice constants of $CuGa_2$ obtained at 25° C. to 200° C. in Test Example 6.
Figure 18B:
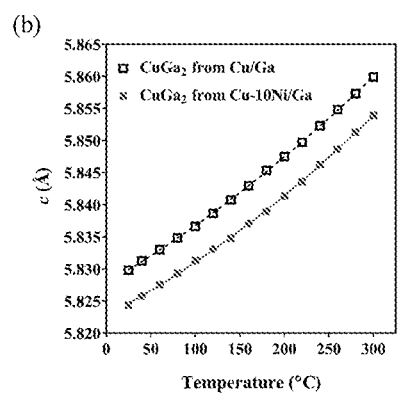
Figure 18C:
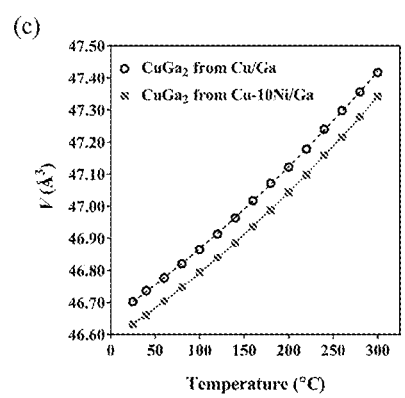

FIGS. 18A, 18B, and 18C illustrate comparison of CuGa$_2$ patterns from Ga/Cu-10Ni reaction during heating. According to the comparison of these patterns, CuGa$_2$ formed on the Cu-10Ni substrate was stable through a temperature range of 25° C. to 300° C.

1) A Ga ingot and a 5% HCl aqueous solution were heated to 35 to 40° C. using water bath.
   The Ga ingot melted and became liquid Ga.
2) Lines were drawn on each of Cu-xNi sheets (x=0, 2, 6, 10, 14%, length of 25 mm, width of 5 mm, thickness of 1 mm) using a permanent marker to distinguish a region (5 mm×5 mm) of 5 mm from the end portion as a joint region.

3) Each of Cu-xNi sheets was put into a flux (commercially available zinc chloride/hydrochloric acid-based flux) of Baker, and then cleaned with ethanol to remove an oxide and other contaminants.

4) The liquid Ga and the cleaned Cu-xNi sheet were transferred to an argon-filled globe box ($O_2$<0.1 ppm, $H_2O$<1 ppm, 27 to 30° C.).

5) The liquid Ga was dropped onto the first Cu-xNi sheet to wet the joint region of 5×5 mm. Thereafter, extra liquid Ga was absorbed back with a pipette to leave a thin Ga layer adhering onto the surface of the first Cu-xNi sheet.

6) The second applied region was joined to the Ga-applied regions of the first Cu-xNi sheet to be opposed to each other using tweezers to obtain the solder joint part (Cu-xNi/Ga/Cu-xNi).

7) The obtained solder joint part was extracted from the globe box.

8) In consideration of growth of the IMC, the solder joint part was put into an annealing oven of 30±3° C. for 7 days. In addition, stationary clips were used to apply pressure to the joint during annealing.

Test Example 7

The shear strengths of the samples of the solder joint parts obtained in Examples 2 and 3 were measured using an Instron 5584 tensile tester and a 10 kN load cell.

The test conditions were as follows.

Strain rate: 0.5 mm/min, maximum load: 1,000 N, and adhesion area: 5×5 mm

Table 4 and FIG. 19 illustrate the acquired test results.

According to the results in Table 4 and FIG. 19, shear strengths of the solder joint parts each between the Cu metal base materials, the Cu-2Ni metal base materials, and the Cu-6Ni metal base materials in the case of using the HCl method were higher than those obtained using the globe box method.

In addition, in the solder joint parts each between the Cu-10Ni metal base materials and the Cu-14Ni metal base materials, the shear strength had an acceptable level as a practical one in each of the HCl method and the globe box method. In the table, the term "Force" indicates force, the term "Stdev" indicates the standard deviation, and the term "Strength" indicates strength.

joint part obtained in Example 2 tends to have a smaller non-wet region than that obtained using the globe box method of Example 3.

The invention claimed is:

1. A method for manufacturing a solder joint part joining a first metal base material and a second metal base material with solder,
at least one metal base material of the first metal base material and the second metal base material being an alloy including Ni in an amount of more than 0 wt % and less than 44 wt % and Cu in an amount of more than 56 wt %,
the solder being one of: a solder alloy containing Ga and inevitable impurities; and a solder alloy containing Ga as a main component and having a melting point of 30° C. or lower, the method comprising:
applying the solder to a surface of the first metal base material and placing the second metal base material on the applied solder; and
heating the first metal base material and the second metal base material to a temperature of 90° C. or lower in one of a noble gas atmosphere, an atmospheric air, and a liquid, to generate $CuGa_2$ or $(Cu, Ni)Ga_2$ between the first metal base material and the second metal base material, thereby joining the first metal material and the second metal material.

2. The method according to claim 1, further comprising applying the solder also to a surface of the second metal base material, allowing the solder applied surface of the first metal base material and the solder applied surface of the second metal base material to face each other, and bringing the surfaces into contact with each other.

3. The method according to claim 1, wherein the solder is directly placed on the surface of the first metal base material or a surface of the second metal base material.

4. The method according to claim 1, wherein each of the first and the second metal base materials is a Cu—Ni alloy containing Ni in an amount of more than 0 wt % and less than 44 wt % and Cu in an amount of more than 56 wt %.

5. The method according to claim 1, wherein the noble gas is one of argon gas and nitrogen gas.

6. The method according to claim 1, wherein the liquid is one of hot water and an aqueous solution of inorganic acid.

7. The method according to claim 1, wherein one of the first and the second metal base materials is a wire formed on an electronic circuit board, and the other is a terminal of an electronic component.

TABLE 4

| | Glovebox method | | | | Immersion in HCl | | | |
|---|---|---|---|---|---|---|---|---|
| x, wt % Ni | Force, N | Stdev, N | Strength, MPa | Stdev, MPa | Force, N | Stdev, N | Strength, MPa | Stdev, MPa |
| Cu | 243.41 | 56.01 | 9.74 | 2.24 | 298.82 | 114.49 | 11.95 | 4.58 |
| Cu—2Ni | 238.27 | 72.67 | 9.53 | 2.91 | 344.28 | 69.77 | 13.56 | 2.97 |
| Cu—6Ni | 273.91 | 72.84 | 10.96 | 2.91 | 355.03 | 38.21 | 14.20 | 1.53 |
| Cu—10Ni | 261.25 | 64.51 | 10.45 | 2.58 | 224.32 | 86.40 | 8.97 | 3.46 |
| Cu—14Ni | 196.86 | 48.92 | 7.87 | 1.96 | 71.93 | 25.84 | 2.88 | 1.03 |

In addition, the microstructures of the solder joint parts obtained in Examples 2 and 3 were observed using a Hitachi 3030 scanning electron microscope. In the observation, when a non-wet Cu substrate region was checked using the EDS method, it proved that the microstructure of the solder 8. A solder joint part comprising a first metal base material and a second metal base material joined to each other via a solder layer, wherein
at least one metal base material of the first metal base material and the second metal base material is an alloy containing Ni in an amount of more than 0 wt % and less than 44 wt % and Cu in an amount of more than 56 wt %, and the solder layer includes a continuous phase of intermetallic compounds of Cu, Ni, and Ga, and contains one of $CuGa_2$ and $(Cu, Ni)Ga_2$.

* * * * *